(12) United States Patent
Graveley et al.

(10) Patent No.: US 12,462,513 B2
(45) Date of Patent: Nov. 4, 2025

(54) SYSTEMS, DEVICES, AND METHODS FOR THREE-DIMENSIONAL IMAGE REGISTRATION

(71) Applicant: Boston Scientific Scimed Inc., Maple Grove, MN (US)

(72) Inventors: Andrew Brian Graveley, Shoreview, MN (US); Daniel J. Foster, Lino Lakes, MN (US); Sebastian Ordas Carboni, Vadnais Heights, MN (US)

(73) Assignee: Boston Scientific Scimed, Inc., Maple Grove, MN (US)

( * ) Notice: Subject to any disclaimer, the term of this patent is extended or adjusted under 35 U.S.C. 154(b) by 181 days.

(21) Appl. No.: 18/455,082

(22) Filed: Aug. 24, 2023

(65) Prior Publication Data
US 2024/0071022 A1 Feb. 29, 2024

Related U.S. Application Data

(60) Provisional application No. 63/374,021, filed on Aug. 31, 2022.

(51) Int. Cl.
G06T 19/20 (2011.01)
A61B 5/06 (2006.01)
(Continued)

(52) U.S. Cl.
CPC .............. G06T 19/20 (2013.01); A61B 5/061 (2013.01); A61B 34/10 (2016.02); A61B 34/20 (2016.02);
(Continued)

(58) Field of Classification Search
None
See application file for complete search history.

(56) References Cited

U.S. PATENT DOCUMENTS 10,782,114 B2  9/2020 Hein et al.
2019/0208995 A1  7/2019 Gilboa
(Continued)

FOREIGN PATENT DOCUMENTS

CN  110974419 A  4/2020
CN  114010314 A  2/2022
(Continued)

OTHER PUBLICATIONS

Zhou et al., Deep learning of the sectional appearances of 3D CT images for anatomical structure segmentation based on an FCN voting method, Oct. 31, 2017, p. 5221-5233 (Year: 2017).*
(Continued)

Primary Examiner — Robert J Craddock
(74) Attorney, Agent, or Firm — Bookoff McAndrews, PLLC

(57) ABSTRACT

A system includes a medical device and computer-readable media storing instructions that, when executed by a processor, cause operations to be performed, including: receiving a three-dimensional (3D) image of anatomy, processing the 3D image to extract a 3D model identifying anatomical structures of interest, receiving images captured by an imaging device of the medical device as the medical device is navigated through a body lumen to a target site, including a current image of the target site, receiving medical device spatial information from a position sensing system including a transmitter/receiver in or on the medical device, processing the images and spatial information to generate a 3D surface map of the body lumen, registering the 3D model to the patient using the map and spatial information, and generating and displaying a graphical user interface overlaying a representation of a position/trajectory of the anatomical structures of interest on the current image.

20 Claims, 6 Drawing Sheets

(51) Int. Cl.
*A61B 34/10* (2016.01)
*A61B 34/20* (2016.01)
*A61B 90/00* (2016.01)
*G06T 7/20* (2017.01)
*G06T 7/33* (2017.01)
*G06T 17/00* (2006.01)
*G06T 19/00* (2011.01)

(52) U.S. Cl.
CPC ............... *A61B 90/37* (2016.02); *G06T 7/20* (2013.01); *G06T 7/344* (2017.01); *G06T 17/00* (2013.01); *G06T 19/006* (2013.01); *A61B 2034/105* (2016.02); *A61B 2034/2051* (2016.02); *A61B 2090/365* (2016.02); *A61B 2090/367* (2016.02); *G06T 2200/04* (2013.01); *G06T 2200/24* (2013.01); *G06T 2207/10068* (2013.01); *G06T 2207/20081* (2013.01); *G06T 2207/30092* (2013.01); *G06T 2207/30241* (2013.01); *G06T 2210/41* (2013.01); *G06T 2219/2004* (2013.01); *G06T 2219/2021* (2013.01)

(56) References Cited

U.S. PATENT DOCUMENTS

| 2020/0297444 A1 | 9/2020 | Camarillo et al. |
| 2021/0052240 A1 | 2/2021 | Weingarten et al. |

FOREIGN PATENT DOCUMENTS

| CN | 114387320 A | 4/2022 |
| CN | 114176775 B | 5/2022 |

OTHER PUBLICATIONS

International Search Report and Written Opinion in International Application No. PCT/US2023/031032, dated Dec. 15, 2023 (12 pages).

* cited by examiner

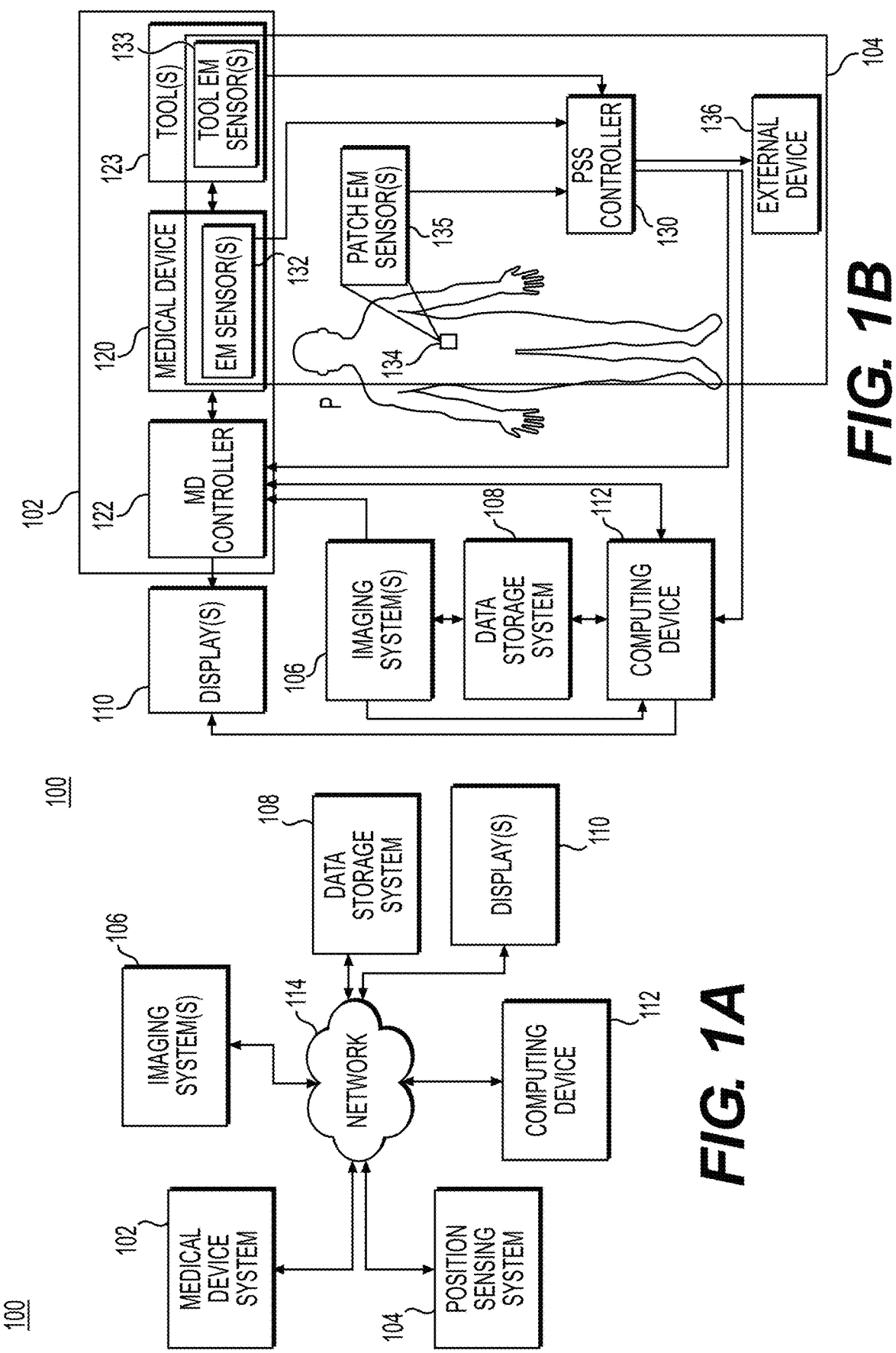

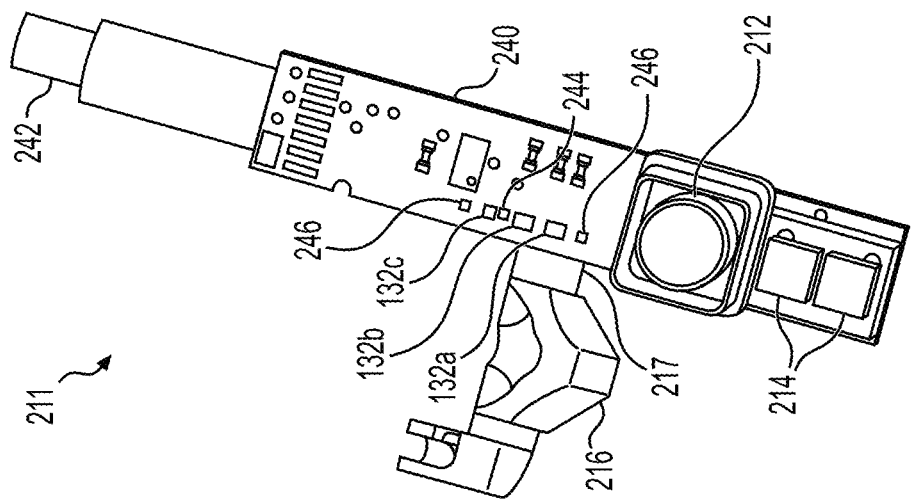
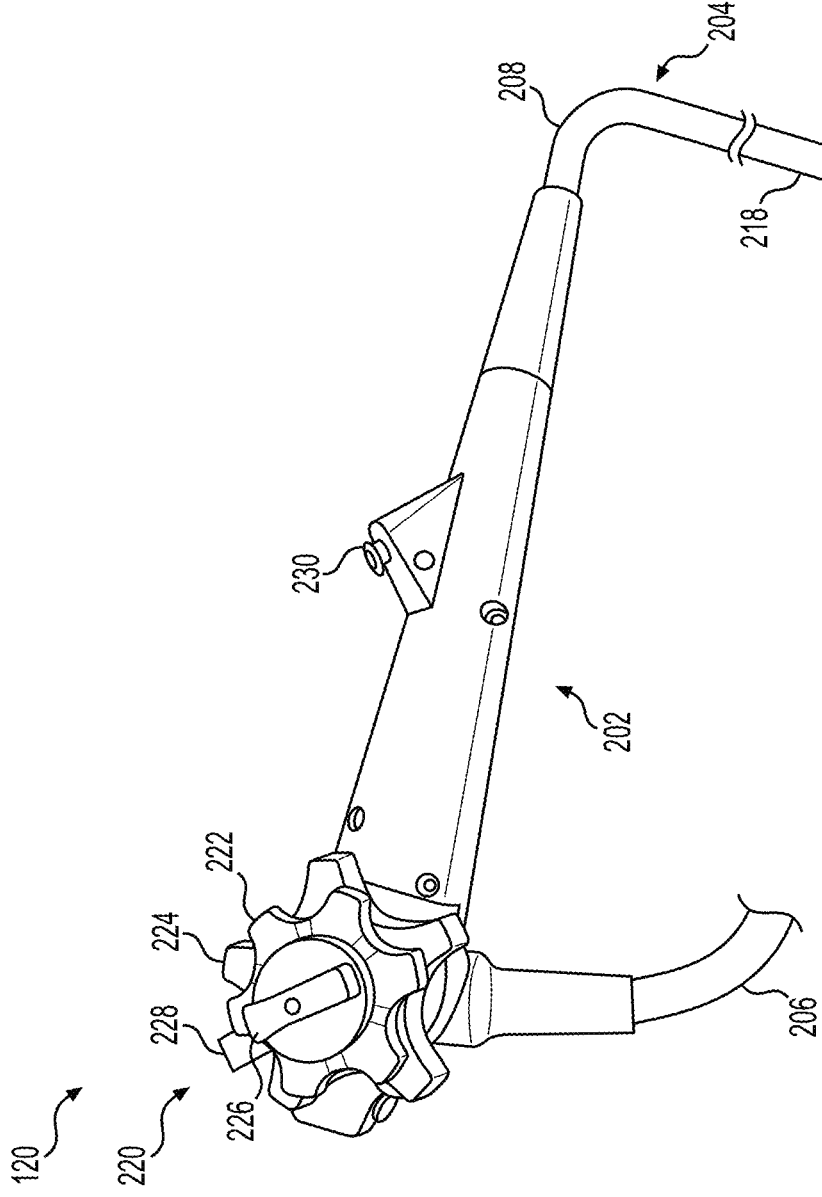
FIG. 2B
FIG. 2A

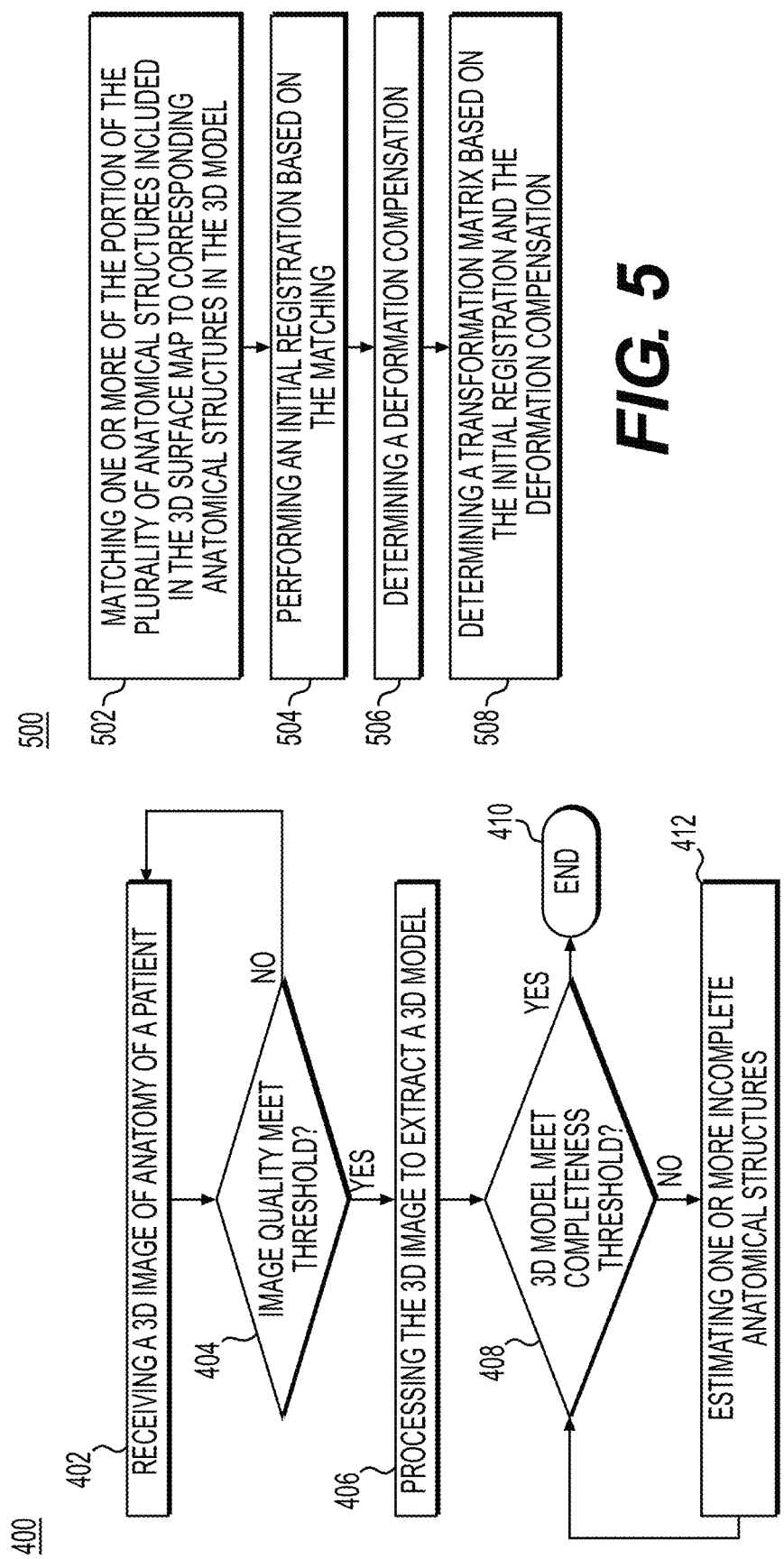

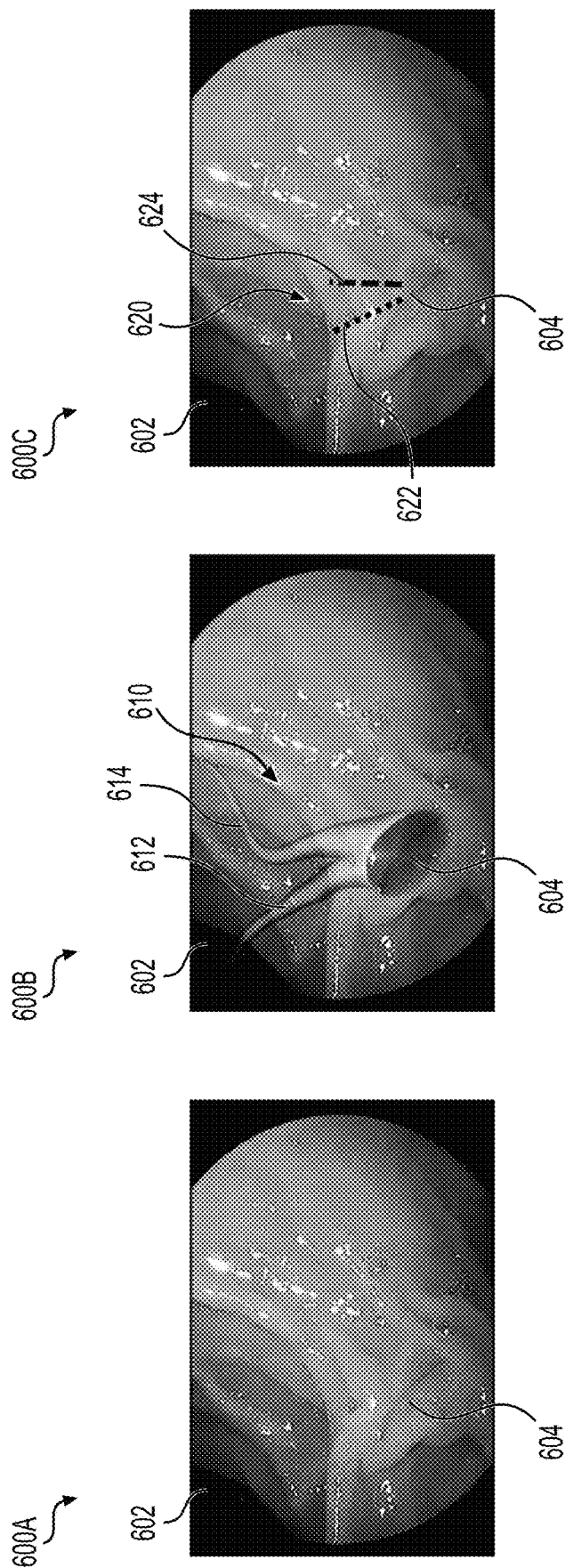

SYSTEMS, DEVICES, AND METHODS FOR THREE-DIMENSIONAL IMAGE REGISTRATION

CROSS-REFERENCE TO RELATED APPLICATIONS

This application claims the benefit of priority from U.S. Provisional Application No. 63/374,021, filed on Aug. 31, 2022, which is incorporated by reference herein in its entirety.

TECHNICAL FIELD

The disclosure relates generally to systems, devices, and methods for three-dimensional (3D) image registration. More specifically, aspects of the disclosure pertain to devices, systems, and/or methods for 3D image registration to generate and display a graphical user interface (GUI) to facilitate a medical procedure.

BACKGROUND

Endoscopic retrograde cholangiopancreatography (ERCP) is a procedure that utilizes endoscopy and fluoroscopy to diagnose and/or treat conditions of the biliary and pancreatic ductal systems, such as strictures. During an exemplary ERCP, an endoscope may be inserted into a patient's mouth and navigated down the esophagus through the stomach into the duodenum and to the papilla, where each of the common bile duct (of the biliary ductal system) and the pancreatic duct enter the duodenum. Cannulation may then be performed by inserting a guide wire, catheter, and/or other device through the papilla and into either the common bile duct or the pancreatic duct. A contrast agent may then be injected, so that an operator may use fluoroscopy and visualize a cause of a stricture within the biliary or pancreatic ductal systems on an x-ray image. The operator may then deliver and/or perform the appropriate treatment.

Cannulation during the ERCP procedure is known to pose various problems for gastroenterologists. Difficulty cannulating often is a result of not being able to visualize a position or trajectory of the common bile duct and/or the pancreatic duct, making it difficult to insert the guide wire, catheter, and/or other device into the desired duct (e.g., into the biliary duct and not into the pancreatic duct). Such difficultly caused by the lack of visualization may prolong a length of the procedure. Additionally, although most attempted ERCP procedures may cannulate successfully, failed attempts do occur, and often require the patient to be referred to a tertiary care specialist. Even in successful cases, the act of cannulating may cause post-ERCP pancreatitis when repeated attempts are made or when excessive force is used.

SUMMARY

A system for three-dimensional (3D) image registration to facilitate a medical procedure may include a medical device having a distal portion configured to be inserted into a body lumen of a patient during a medical procedure. The medical device may include an imaging device located at a distal tip of the distal portion and configured to capture a plurality of images of the body lumen as the medical device is inserted into and navigated through the body lumen to a target site. At least one of the plurality of images may include a current image of the target site. The medical device may also include a transmitter device or a receiver device of a position sensing system located at the distal tip, where the position sensing system is configured to determine a position or an orientation of the distal tip. The system may also include a non-transitory computer-readable medium storing instructions that, when executed by a processor of a computing device, causes the processor to execute the instructions to perform operations. The operations may include receiving a 3D image of anatomy of the patient captured by an imaging system prior to the medical procedure, and processing the 3D image to extract a 3D model that identifies a plurality of anatomical structures in the anatomy, including one or more anatomical structures of interest for the medical procedure. The operations may also include receiving the plurality of images of the body lumen captured by the imaging device during the medical procedure, receiving the position or the orientation of the distal tip of the medical device from the position sensing system, and processing the plurality of images of the body lumen and the position or the orientation of the distal tip to generate a 3D surface map of at least a portion of the body lumen. The 3D surface map may include a portion of the plurality of anatomical structures without the one or more anatomical structures of interest. The operations may further include registering the 3D model to the patient using the 3D surface map and the position or the orientation of the distal tip, generating a graphical user interface (GUI) that overlays a representation of a position or a trajectory of the one or more anatomical structures of interest on the current image of the target site based on the registering, and causing display of the GUI on a display device.

In any of the exemplary systems disclosed herein, the operations may also include determining that one or more of the plurality of anatomical structures identified in the 3D model are incomplete, and estimating an incomplete portion of the one or more of the plurality of anatomical structures. The operations may further include generating a prompt with instructions for an operator to confirm the estimated incomplete portion, and causing display of the 3D model including the estimated incomplete portion and the prompt via the display device, where the prompt may be displayed in association with the estimated incomplete portion of the 3D model. The operations may yet further include determining that additional image data is needed to generate the 3D surface map based on a number or type of anatomical structures in the portion of the plurality of anatomical structures included in the 3D surface map, generating a prompt with instructions for an operator to move the medical device to one or more positions in the body lumen corresponding to one or more of the plurality of anatomical structures that are not included in the portion or that are included in the portion and are incomplete to capture the additional image data via the imaging device of medical device, and causing display of the prompt via the display device.

In some aspects, registering the 3D model to the patient may include determining a transformation matrix, and applying the transformation matrix to the 3D model to transform the 3D model. One or more of the portion of the plurality anatomical structures included in the 3D surface map may be matched to corresponding anatomical structures in the 3D model, an initial registration may be performed based on the matching, a deformation compensation may be determined, and the transformation matrix may be determined based on the initial registration and the deformation compensation. The GUI may be generated using the transformed 3D model, and the representation of the position or the trajectory of the one or more anatomical structures of interest includes at least one of: a portion of the transformed 3D model including the one or more anatomical structures of interest, a wireframe model of the one or more anatomical structures of interest, a centerline representation for the one or more anatomical structures of interest, a sequence of discs positioned orthogonal to the centerline for the one or more anatomical structures of interest, or a tubular structure for the one or more anatomical structures of interest.

In other aspects, the operations may also include receiving spatial information for the patient from the position sensing system, where the position sensing system includes one or more transmitter devices or receiver devices located in a patch applied locally to the patient, and the 3D model may be registered to the patient using the 3D surface map, the spatial information for the medical device, and the spatial information for the patient. The operations may further include identifying one or more anatomical structures from the portion of the plurality of anatomical structures in the 3D surface map by providing the plurality of images as input to a machine learning model that is trained to predict the one or more anatomical structures present in each of the plurality of images. The operations may yet further include identifying one or more anatomical structures from the portion of the plurality of anatomical structures in the 3D surface map by mapping a geometric shape of the one or more anatomical structures as 3D surfaces as part of the generation of the 3D surface map, and identifying the anatomical structure based on the mapped geometric shape.

In further aspects, the target site may be a site for cannulation, and as the cannulation occurs a movement at the target site may be tracked and the GUI may be updated to deform the representation of the position or the trajectory of the one or more anatomical structures of interest overlaying the current image of the target site to match the movement of the target site. Spatial information for a tool delivered to the target site via the medical device may be received from the position sensing system as the tool is advanced through at least one of the one or more anatomical structures of interest, where the tool includes one or more transmitter devices or one or more receiver devices of the position sensing system, and the GUI may be updated using the spatial information for the tool to depict a representation of the tool advancing through the representation of the position or the trajectory of the at least one of the one or more anatomical structures of interest overlaid on the current image of the target site.

In other aspects, an additional 3D image captured intraoperatively after the medical device is navigated through the body lumen to the target site may be received and processed in addition to the processing of the plurality of images to generate the 3D surface map. Additionally, a determination that an image quality of the 3D image meets a predefined threshold may be made prior to processing the 3D image to extract the 3D model. The medical procedure may be an ERCP procedure. The target site may be a papilla for cannulation, and the one or more anatomical structures of interest may include at least a common bile duct and a pancreatic duct. The GUI generated using the registered 3D model may overlay the representation of the position or the trajectory of the common bile duct and the pancreatic duct on the current image of the papilla to create an augmented reality image.

In other examples, a method for 3D image registration to facilitate a medical procedure may include receiving a 3D image of anatomy of a patient, and processing the 3D image to extract a 3D model that identifies a plurality of anatomical structures in the anatomy, including one or more anatomical structures of interest for a medical procedure. The method may also include receiving a plurality of images of a body lumen of the patient captured by an imaging device of a medical device as the medical device is inserted into and navigated through the body lumen to a target site during the medical procedure. At least one of the plurality of images received may include a current image of the target site. The method may further include receiving spatial information for the medical device from a position sensing system, where the position sensing system may include a transmitter device or a receiver device located in or on the medical device, and processing the plurality of images of the body lumen and the spatial information for the medical device to generate a 3D surface map of at least a portion of the body lumen. The 3D surface map may include a portion of the plurality of anatomical structures without the one or more anatomical structures of interest. The method may further include registering the 3D model to the patient using the 3D surface map and the spatial information for the medical device. The registering may include a determination of a transformation matrix. The method may yet further include applying the transformation matrix to the 3D model to transform the 3D model, generating a GUI using the transformed 3D model that overlays a representation of a position or a trajectory of the one or more anatomical structures of interest on the current image of the target site, and causing display of the GUI on a display device.

Any of the exemplary methods disclosed herein may include any of the following features. Spatial information for the patient may be received from the position sensing system, where the position sensing system may include one or more transmitter devices or receiver devices located in a patch applied locally to the patient. The 3D model may be registered to the patient using the 3D surface map, the spatial information for the medical device, and the spatial information for the patient. To register the 3D model to the patient, one or more of the portion of the plurality anatomical structures included in the 3D surface map may be matched to corresponding anatomical structures in the 3D model, an initial registration may be performed based on the matching, a deformation compensation may be determined, the transformation matrix may be determined based on the initial registration and the deformation compensation.

In a further example, a method for 3D image registration to facilitate an ERCP procedure may include receiving a 3D image of anatomy of a patient, and processing the 3D image to extract a 3D model that identifies a plurality of anatomical structures in the anatomy, including anatomical structures of an upper gastrointestinal (GI) tract and a biliopancreatic tree of the patient, where at least a common bile duct and a pancreatic duct are anatomical structures of interest for the ERCP procedure. The method may also include receiving a plurality of images of the upper GI tract as a medical device is inserted into a mouth of the patient and navigated through the upper GI tract of the patient to a papilla during the ERCP procedure, including a current image of the papilla, captured by an imaging device of the medical device, the papilla being a target site for cannulation, receiving spatial information for the medical device from a position sensing system, the position sensing system including a transmitter device or a receiver device located in or on the medical device, and processing the plurality of images and the spatial information for the medical device to generate a 3D surface map. The 3D surface map may include a portion of the plurality of anatomical structures of the upper GI tract identified in the 3D model and the papilla. The method may also include registering the 3D model to the patient using the 3D surface map and the spatial information for the medical device, generating a graphical user interface (GUI) that overlays a representation of a position or a trajectory of at least the common bile duct and the pancreatic duct on the current image of the papilla based on the registering; and causing display of the GUI on a display device to provide visual guidance for the cannulation of the papilla.

Any of the exemplary methods disclosed herein may include any of the following features. A movement of the papilla may be tracked as the cannulation occurs. The GUI may be updated to deform the representation of the position or the trajectory of the common bile duct and the pancreatic duct overlaying the current image of the papilla to match the movement of the papilla.

It may be understood that both the foregoing general description and the following detailed description are exemplary and explanatory only and are not restrictive of the invention, as claimed. As used herein, the terms "comprises," "comprising," "including," or any other variation thereof, are intended to cover a non-exclusive inclusion, such that a process, method, article, or apparatus that comprises a list of elements does not include only those elements, but may include other elements not expressly listed or inherent to such process, method, article, or apparatus. The term "exemplary" is used in the sense of "example," rather than "ideal." The term "distal" refers to a direction away from an operator/toward a target site, and the term "proximal" refers to a direction toward an operator. The term "approximately," or like terms (e.g., "substantially"), includes values +/−10% of a stated value.

BRIEF DESCRIPTION OF THE DRAWINGS

The accompanying drawings, which are incorporated in and constitute a part of this specification, illustrate examples of this disclosure and together with the description, serve to explain the principles of the disclosure.

FIGS. 1A and 1B depict an exemplary environment where three-dimensional (3D) image registration may be implemented to facilitate a medical procedure.

FIGS. 2A and 2B depict an exemplary medical device used in the exemplary environment of FIGS. 1A and 1B.

FIG. 4 depicts an exemplary process for extracting a 3D model for use in 3D image registration.

FIG. 5 depicts an exemplary process for registering a 3D model to a patient.

FIGS. 6A-6C depict exemplary graphical user interfaces (GUIs).

DETAILED DESCRIPTION

Figure 3:
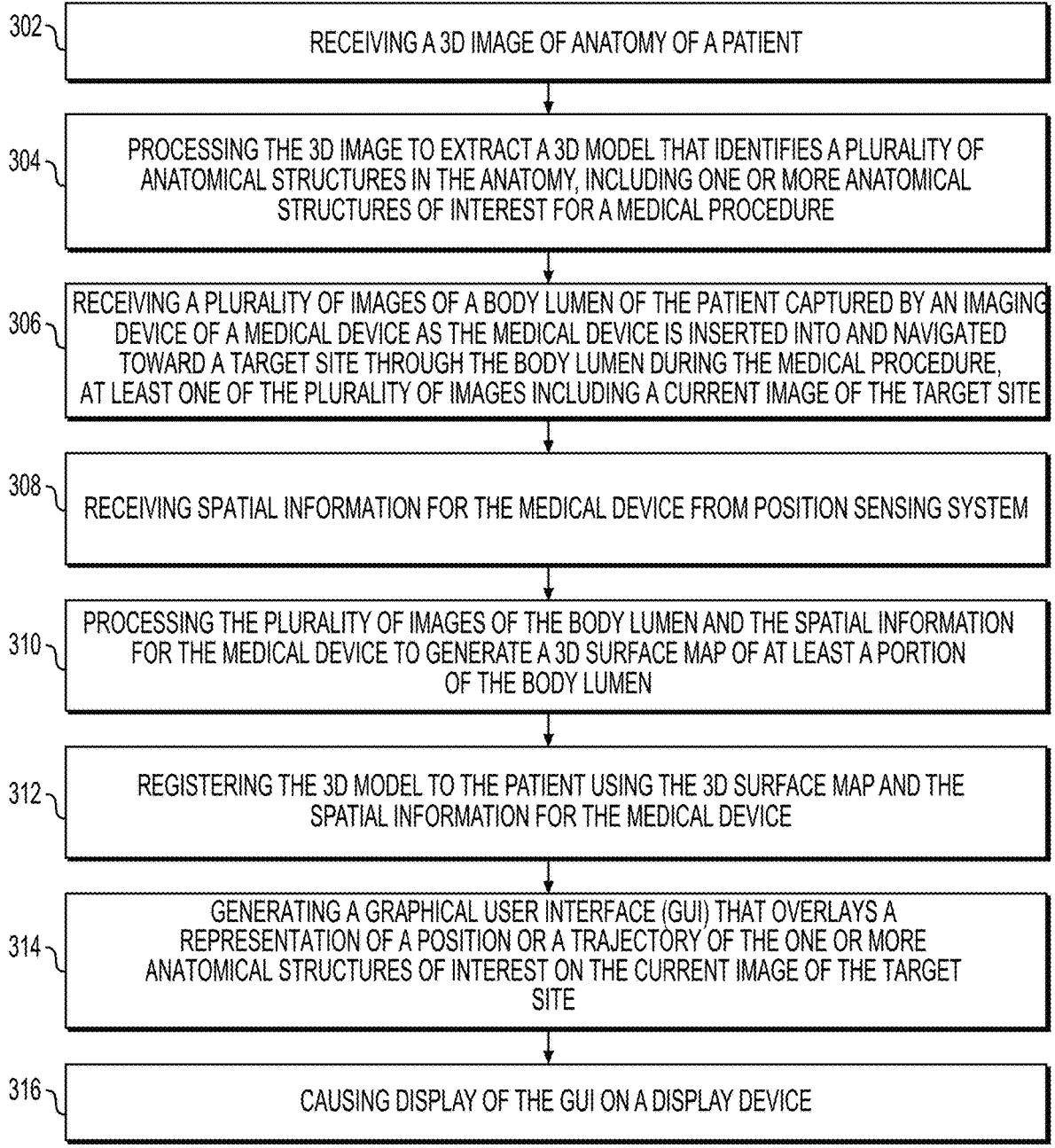
FIG. 3 depicts an exemplary process for 3D image registration.

As briefly described above, during an exemplary endoscopic retrograde cholangiopancreatography (ERCP), an endoscope, such as a duodenoscope, may be inserted into a patient's mouth and navigated down the esophagus through the stomach into the duodenum and to the papilla, where each of the common bile duct and the pancreatic duct enter the duodenum. Cannulation may then be performed by inserting a guide wire, catheter, and/or other device through the papilla and into a desired duct (e.g., either the common bile duct or the pancreatic duct). An imaging device of the endoscope may capture images that enable visualization of the papilla. However, based on the anatomical structure of the papilla, the common bile duct and the pancreatic duct are not visible in the endoscopic images. Resultantly, cannulating the papilla to insert the guide wire, catheter, and/or other device into the desired duct may be difficult, as the position or trajectory of the common bile duct and pancreatic duct are unable to be visualized.

Due to the lack of visualization, multiple cannulation attempts may be performed and/or an incorrect duct may be inadvertently entered. Multiple cannulation attempts may increase a duration of the procedure. Additionally, repeated cannulation attempts may irritate the tissue of the papilla, which may cause the tissue to swell and/or close. The swelling and/or closing may prevent the pancreatic ducts from draining properly, may lead to a build-up of fluid in the pancreas, and/or may potentially cause post-ERCP pancreatitis. Further, if an incorrect duct is entered, such as the pancreatic duct, and contrast agent is injected into the pancreatic duct for fluoroscopy, the contrast agent may irritate the pancreas, often leading to post-ERCP pancreatitis. In cases where multiple cannulation attempts are performed and/or contrast agent was erroneously injected into the pancreatic duct, the patients may be referred to a tertiary care specialist to prevent and/or manage post-ERCP pancreatitis, which may be extremely painful for the patients and costly for the health care system.

To reduce the difficulty of cannulation and decrease a number of patients developing post-ERCP pancreatitis, embodiments disclosed herein present systems, devices, and methods for 3D image registration to enable generation of a graphical user interface (GUI) that overlays a representation of a position and/or a trajectory of at least the common bile duct and the pancreatic duct extending from the papilla on the endoscopic image of the papilla to provide visual guidance for the cannulation of the papilla.

FIG. 1A depicts an exemplary environment 100 where 3D image registration may be implemented to facilitate a medical procedure. Environment 100 may include a medical device system 102, a position sensing system 104, imaging system(s) 106, a data storage system 108, display(s) 110, and a computing device 112 that each communicate with one or more other components of environment 100 over a wired or wireless network, such as a network 114. FIG. 1B depicts exemplary components of medical device system 102 and position sensing system 104 in environment 100.

Referring concurrently to FIGS. 1A and 1B, medical device system 102 may include a medical device 120 and a medical device (MD) controller 122. Medical device 120 may be used to perform a medical procedure. Medical device 120 may be an endoscope, and the endoscope may be a specialized type of endoscope utilized for the medical procedure. For example, medical device 120 may be a duodenoscope used to perform an ERCP procedure. In some examples, medical device 120 may include one or more position sensing components of position sensing system 104, such as electromagnetic (EM) sensor(s) 132, integrated in at least a distal portion (e.g., a distal tip) of medical device 120 to enable a position and/or orientation of medical device 120 to be tracked during the medical procedure. Additionally or alternatively, medical device 120 may include a fiber optic shape sensor, an accelerometer, and/or gyroscopic sensor to help enable estimation of a spatial position and/or orientation of medical device 120 during the medical procedure.

MD controller 122 may be a computing device communicatively coupled to medical device 120 to transmit and receive signals from medical device 120. For example, MD controller may transmit signals to cause one or more illumination devices (see FIGS. 2A and 2B) of medical device 120 to illuminate an area of interest within a body lumen of a patient P. Additionally, MD controller 122 may receive image signals from one or more imaging devices (see FIGS. 2A and 2B) of medical device 120. MD controller 122 may have one or more applications (e.g., software programs) locally installed for performing image processing that may be executed to process the image signals to generate an image (e.g., a live image) for display on one or more of display(s) 110 communicatively coupled to MD controller 122. For example, as medical device 120 is inserted into and navigated toward a target site through a body lumen of patient P, a plurality of image signals may be received from the one or more imaging devices and processed by MD controller 122 to generate and cause display of a plurality of corresponding images.

In some examples, MD controller 122 may have one or more additional applications (e.g., software programs) installed locally to perform one or more operations associated with 3D image registration (e.g., one or more operations described in FIG. 3). For example, the plurality of images generated may be processed to generate a 3D surface map of the body lumen, where the 3D surface map is used as part of the registration process, as described in more detail below. In other examples, the images may be transmitted to another system and/or computing device within environment 100 for processing, analysis, storage, display, etc.

One or more components of MD controller 122, such as one of the applications, may generate, or may cause to be generated, one or more GUIs based on instructions/information stored in the memory, instructions/information received from the other components in environment 100, and/or the like. One or more components of MD controller 122 may also cause the GUIs to be displayed via one of display(s) 110. The GUIs may include images, text, input text boxes, selection controls, and/or the like.

Medical device system 102 may also include tool(s) 123 that may be inserted and/or delivered into the body lumen of patient P via medical device 120. The one or more tools may be extended distally from medical device 120 for use during the medical procedure. Exemplary tool(s) 123 used in conjunction with medical device 120 for the ERCP procedure may include tools for cannulation (e.g., sphincterotomes), cholangioscopes, catheters, balloons, stent delivery systems, forceps, baskets, nets, biopsy needles, and/or guide wires, among other similar tools to facilitate diagnosis and/or treatment. In some examples, tool(s) 123 may also include position sensing components of position sensing system 104, such as one or more tool EM sensor(s) 133, integrated therein to enable a position and/or orientation of tool(s) 123 to be tracked during the medical procedure. For example, tool EM sensor(s) 133 may be located in or on at least a distal tip or distal portion(s) of tool(s) 123 to help track at least a position and/or an orientation of the distal tip or distal portion of tool(s) 123. Additionally or alternatively, tool(s) 123 may include a fiber optic shape sensor, an accelerometer, and/or gyroscopic sensor to help enable estimation of a spatial position and/or orientation of tool(s) 123 (e.g., the distal tip or distal portion of tool(s) 123) during the medical procedure.

Position sensing system 104 may be a spatial tracking system for determining a position and/or orientation of one or more components of medical device system 102 and/or other components of the environment 100 within and/or on the body of patient P. Position sensing system 104 may incorporate any of the features described in U.S. Pat. No. 10,782,114, issued on Sep. 22, 2020, the entirety of which is incorporated herein by reference. Position sensing system 104 may be an EM-based tracking system that includes a position sensing system (PSS) controller 130 communicatively coupled to one or more transmitter devices for generating an electromagnetic field, and one or more receiver devices for detecting the electromagnetic field generated. The position and/or orientation determinations of medical device 120 and/or tool(s) 123 may be based on a strength of the field detected by the receiver devices.

The one or more transmitter devices may include an external device 136 (e.g., an external field generator), for example, adjacent to patient P. The one or more transmitter devices may each include elements to generate a magnetic field. For example, the one or more transmitter devices may each include one or more coils (e.g., solenoids) and one or more circuitry element(s) that transmit current through the coil(s). The coil(s) may thus generate a magnetic field.

The one or more receiver devices may include at least one or more EM sensor(s) 132 located in or on medical device 120 to help enable determination of a position and/or an orientation of medical device 120, as described in detail with reference to FIGS. 2A and 2B. The position and/or the orientation of medical device 120 may be used in conjunction with the above-described 3D surface map generated from the plurality of images captured by medical device 120 as part of the registration process.

In some examples, the one or more receiver devices may also include one or more tool EM sensor(s) 133 located in or on tool(s) 123 to help enable determination of a position and/or an orientation of tool(s) 123. The position and/or the orientation of tool(s) 123 may be used to track tool(s) 123 as it or they extend distally from medical device 120 and enter anatomical structures during the medical procedure, which may help to enable the advancement of tool(s) 123 through the anatomical structures to be visually guided, as described in detail below.

In some embodiments, environment 100 may also include a patch 134 that may be locally applied to patient P for at least a duration of the medical procedure. In some aspects, the one or more receiver devices of position sensing system 104 may further include one or more patch EM sensor(s) 135 located in or on patch 134. Patch EM sensor(s) 135 may help to enable determination of a position and/or an orientation of patient P to determine whether patient P, e.g., moves during the medical procedure, including any respiratory motion that may affect registration. Any movement of patient P may, therefore, be accounted or compensated for during the registration process. As discussed in further detail below, in some examples, patch 134 may be placed prior to the medical procedure for preoperative 3D imaging, which may further facilitate registration. For example, patch 134 may also include one or more radiopaque markers, MRI markers, or the like that may be captured in the preoperative 3D image.

The one or more receiver devices (e.g., one or more patch EM sensor(s) 135) may each include one or more magnetic field sensors. Magnetic field sensors may include, for example, magneto-resistive (MR) elements, such as tunneling magneto-resistive (TMR) elements, anisotropic-magneto-resistive sensing elements, giant magneto-resistive sensing elements, hall-effect sensing elements, colossal magneto-resistive sensing elements, extraordinary magneto-resistive sensing elements, or semiconductor magneto-resistive elements. Additionally or alternatively, magnetic field sensors may include one or more inductive sensors (e.g., inductive coil sensors), planar coil sensors, spin Hall sensing elements (or other Hall sensing elements), or magnetic gradiometer(s). Magnetic field sensors of the one or more receiver devices may have any properties of magnetic field sensors (including, e.g., TMR sensors) known in the art. For example, the magnetic field sensors may include a fixed layer, a tunnel layer, and a free layer. A resistance may change when the free layer is aligned with the fixed layer.

In some examples, at least a portion of the one or more receiver devices, such as EM sensor(s) 132 and/or patch EM sensor(s) 135, may include magnetic field sensors arranged in a dual-axis, six-degree-of-freedom arrangement to enable measurements of x, y, z, roll, pitch, and yaw. For example, these one or more receiver devices may include three magnetic field sensors (see FIG. 2B) arranged in a dual-axis, six-degree-of-freedom arrangement to enable a positioning of an imaging plane to be determined in three dimensions based on the measurements of x, y, z, roll, pitch, and yaw. In such an arrangement, two of three magnetic field sensors may be oriented such that their primary sensing direction is aligned with (approximately parallel to) a longitudinal axis of a respective device in which they are integrated, respectively. A full-Wheatstone bridge configuration may be utilized by the two magnetic field sensors. The third magnetic field sensor may be arranged such that its primary sensing direction is transverse (e.g., approximately orthogonal/perpendicular) to the longitudinal axis. A half-Wheatstone bridge configuration may be utilized by the third magnetic field sensor. The Wheatstone bridges may have any characteristics of Wheatstone bridges known in the art.

Position sensing system 104 may have other configurations within the scope of the disclosure. For example, a tri-axis configuration may be utilized for magnetic field sensors of the receiver devices, in which each of three magnetic field sensors is arranged so that its primary sensing direction is aligned with a different axis (e.g., the primary sensing directions of magnetic field sensors are aligned orthogonally to one another). For example, a first magnetic field sensor may have a primary sensing direction of the X-axis, a second magnetic field sensor may have a primary sensing direction of the Y-axis, and a third magnetic field sensor may have a primary sensing direction of the Z-axis. In such a tri-axis configuration, each of the magnetic field sensors, may utilize a half-Wheatstone bridge configuration. In another example, only two magnetic field sensors may be utilized by the receiver device to measure six degrees of freedom, with each of the two magnetic field sensors having a half-Wheatstone bridge configuration (or a full Wheatstone bridge configuration). In a further example, two magnetic field sensors could be used to measure five degrees of freedom. In such an example, position sensing system 104 may be unable to measure roll. In an additional example, a single magnetic field sensor may be implemented by the receiver devices and use a half Wheatstone bridge to measure five degrees of freedom.

In the examples described above, external device 136 is a transmitter device, and EM sensor(s) 132 and/or patch EM sensor(s) 135 are receiver devices. In other examples, EM sensor(s) 132 and/or patch EM sensor(s) 135 may be transmitter devices, and external device 136 may be a receiver device.

PSS controller 130 may be communicatively coupled to the one or more transmitter devices and the one or more receiver devices of position sensing system 104. For example, as shown in FIG. 1B, PSS controller 130 may be communicatively coupled to external device 136, EM sensor(s) 132, and/or patch EM sensor(s) 135. PSS controller 130 may transmit signals to external device 136, for example, to initiate generation of the magnetic field, as well as subsequently pause, stop, and/or restart generation of the magnetic field. Additionally, PSS controller 130 may receive signals from EM sensor(s) 132 and/or patch EM sensor(s) 135, the signals indicating a strength of (e.g., a voltage induced by) the magnetic field that is detected by EM sensor(s) 132 and/or patch EM sensor(s) 135. A position and/or an orientation of medical device 120, and specifically at least a distal tip of medical device 120 (see FIGS. 2A and 2B) may be determined based on the signals received from EM sensor(s) 132. Additionally, a position and/or orientation of patient P may be determined based on the signals received from patch EM sensor(s) 135, for example, to help identify any patient movement, including respiratory motion, that may affect registration and thus may be accounted for during registration.

Environment 100 may include imaging system(s) 106, for example, for capturing images of anatomy of patient P. Environment may also include data storage system 108, for example, for storing the images captured by imaging system(s) 106. The images captured may be three-dimensional (3D) images. Alternatively or additionally, the images may be two-dimensional (2D) images that may be reconstructed into 3D images using techniques that are known or may become known in the art. At least one of the 3D images captured may be used to extract a 3D model that identifies a plurality of anatomical structures in the anatomy of patient P, including one or more anatomical structures of interest based on the medical procedure, such as the biliary and pancreatic ducts for an ERCP procedure. The extracted 3D model may be registered to the patient as part of the registration process. For example, the 3D model may be registered to patient P using the 3D surface map generated from the plurality of images captured by medical device 120 and the position and/or the orientation of medical device 120 determined by position sensing system 104, as described in detail below.

Imaging system(s) 106 may include one or more preoperative imaging systems. Modalities of exemplary preoperative imaging systems may include computed tomography (CT), magnetic resonance cholangiopancreatography (MRCP), ultrasound (US), or other similar three-dimensional (3D) imaging modalities. In some examples, preoperative imaging may be ordered specifically in preparation for the medical procedure. For example, a gastroenterologist may schedule patient P for an ERCP procedure, and may also order preoperative imaging in preparation for the ERCP procedure. In such examples, patient P may be positioned in a same or similar position during imaging as to how the patient is positioned during the procedure. In other examples, the preoperative images available for patient P may have been ordered for diagnostic or other exemplary purposes. Resultantly, patient P may not be positioned in the same or similar position during imaging as to how the patient is positioned during the procedure, which may be accounted for during the image registration process, described in detail below.

In some examples, imaging system(s) 106 may also include intraoperative imaging systems. The intraoperative imaging systems may be in addition to and/or an alternative to the one or more preoperative imaging systems. Exemplary modalities of intraoperative imaging systems may include non-3D imaging modalities that may be used to reconstruct a 3D image such as transabdominal US, endoscopic US, and/or fluoroscopy. Additionally or alternatively, exemplary modalities of intraoperative imaging systems may include intraoperative 3D imaging modalities such as fluoroscopic cone beam CT, C-arm based tomography, and/ or digital tomosynthesis. In examples where imaging system(s) 106 include intraoperative 3D imaging modalities, one or more additional 3D images may optionally be captured by one of the intraoperative 3D imaging modalities during the medical procedure to facilitate generation of the 3D surface map. For example, the additional 3D images may be used in conjunction with the plurality of images captured by medical device 120 to generate the 3D surface map, as described in detail below.

In some examples, each of imaging system(s) 106 may include and/or may be associated with a computing device (e.g., distinct from separate computing device 112). The computing device may include one or more applications (e.g., software programs) locally installed on, e.g., a memory of computing device for performing image processing that may be executed to generate images. Additionally, one or more components of the computing device, such as one of the applications, may generate, or may cause to be generated, one or more GUIs based on instructions/information stored in the memory, instructions/information received from the other components in environment 100, and/or the like. The one or more components of the computing device may cause the GUIs to be displayed via one of display(s) 110. The GUIs may include images, text, input text boxes, selection controls, and/or the like, and may enable operator interaction with the images captured by a respective modality from the various above-described modalities. For example, the computing device may generate and display the 3D image from image signals received from the respective modality, and an operator may utilize the application to manipulate the 3D image (e.g., rotate, zoom in, zoom out, annotate objects or anatomical structures, etc.).

In some examples, the computing device may have one or more additional applications installed locally to perform one or more operations associated with 3D image registration (e.g., one or more operations described in FIG. 3). For example, the 3D image generated may be processed to extract a 3D model, where the 3D model is registered to patient P, as described in detail below. In other examples, the 3D image may be transmitted to another system and/or computing device within environment 100 for processing, analysis, storage, display, etc. Additionally, imaging system(s) 106 and one or more other components of environment 100, such as data storage system 108, may be components or sub-systems of a larger system, such as a picture archiving and communication (PACs) system.

Data storage system 108 may include a server system or computer-readable memory, such as a hard drive, flash drive, disk, etc. Data storage system 108 includes and/or interacts with an interface for exchanging data to other systems, e.g., one or more of the other components of environment 100. For example, data storage system 108 may be configured to receive and store 3D images for patient P generated by one or more of imaging system(s) 106. As another example, data storage system 108 may be configured to receive and store the plurality of images of the body lumen of patient P from medical device system 102. As a further example, data storage system 108 may be configured to receive spatial information for medical device 120 and/or patient P from position sensing system 104.

Display(s) 110 may be communicatively coupled to one or more other components of environment 100, for example, to receive and display data, including image data. As one example, display(s) 110 may receive and display the 3D image that was captured by one of imaging system(s) 106 and processed to extract the 3D model. Additionally, display(s) 110 may receive and display the extracted 3D model. As another example, display(s) 110 may receive the plurality of images captured by medical device 120, for example, as medical device 120 is being inserted into and navigated toward the target site through the body lumen of patient P. Additionally, display(s) 110 may receive and display the 3D surface map generated by processing the plurality of images.

Further, once 3D image registration has been completed, display(s) 110 may receive and display a GUI that overlays a representation of a position or a trajectory of one or more anatomical structures of interest for the medical procedure on a current image of the target site (e.g., the current image of the target image being one of the plurality of images captured by medical device 120), described in detail below. For example, for an ERCP procedure, the GUI may overlay a representation of a position or trajectory of the common bile duct and the pancreatic duct on a current image of the papilla to provide visual guidance of cannulation through the papilla and into one of the ducts. In some examples, display(s) 110 may be interactive displays and/or displays of a computing device configured to receive input from an operator to enable operator interaction with the image data.

Computing device 112 may be a stand-alone computing device configured to communicate with one or more of the other components of environment 100 across network 114. For example, computing device 112 may communicate across network 114 with one or more of medical device system 102, position sensing system 104, imaging system(s) 106, and/or data storage system 108, to exchange information, including to receive image data and spatial data (e.g., position and/or orientation information). Computing device 112 may be a computer system, such as, for example, a desktop computer, a laptop computer, a tablet, a smart cellular phone, a smart watch or other electronic wearable, etc.

In some examples, computing device 112 may include one or more application(s), e.g., a program, plugin, etc., locally installed on a memory of computing device 112 to perform one or more operations associated with 3D image registration based on the information received. For example, using the 3D model extracted from the 3D image captured by one of imaging system(s) 106, the 3D surface map generated from the plurality of images captured by medical device 120, and spatial information for at least medical device 120 determined by position sensing system 104, the 3D model may be registered to the patient. In some examples, computing device 112 may receive the 3D model and the 3D surface map from other respective components of environment 100. In other examples, computing device 112 may generate the 3D model and 3D surface map.

Additionally, one or more components of computing device 112, such as one of the applications, may generate, or may cause to be generated, one or more GUIs based on instructions/information stored in the memory, instructions/information received from the other components in environment 100, and/or the like. Moreover, one or more components of computing device 112 may cause the GUIs to be displayed via a display of computing device 112 or via one or more other displays (e.g., display(s) 110). The GUIs may include text, input text boxes, selection controls, and/or the like. The display may include a touch screen or a display with other input systems (e.g., a mouse, keyboard, etc.) for the operator of computing device 112 to control the functions of computing device 112.

For example, and as shown in FIGS. 6A-6C, once the 3D model is registered to the patient, a GUI may be generated for display. The GUI may include a representation of a position and/or trajectory of one or more anatomical structures of interest for the medical procedure that is generated using the 3D image that has been transformed based on the registration. The representation may be overlaid on the current image of the target site captured by medical device 120 (e.g., one of the plurality of images). Additionally, throughout the registration process, one or more prompts may be generated and displayed to the operator, e.g., to ask the operator to confirm and/or modify automatic determinations or identifications made by the application.

Computing device 112 is described as including an application configured to perform one or more operations or steps of the 3D image registration (e.g., one or more steps described in FIG. 3 below). Additionally or alternatively, one or more of other computing devices, such as computing devices of or associated with imaging system(s) 106 and/or MD controller 122, may include the same or similar application to perform at least a portion (or all) of the operations of the 3D image registration. In some examples, one application operating on a single computing device of environment 100 may be configured to perform each of the steps (e.g., 3D model extraction, 3D surface map generation, registration, and GUI generation). In other examples, multiple applications running on a same or across different computing devices of environment 100 may perform different operations. As one non-limiting example, one application may be configured to perform operations related to 3D model extraction, and another application may be configured to performed operations related to 3D surface map generation. Furthermore, a further application may be configured to perform operations related to registration and/or GUI generation.

The one or more applications executed on the one or more components of environment 100 are described herein as local applications that are installed, e.g., on a memory of the respective components such that a network connection (e.g., Internet access) is not required to enable communication with a remote server and the application to function. However, in other embodiments, the applications may be web-based applications that are accessible via a browser executing on the component, where the one or more application may communicate with a remote server (not shown) over network 114. In such examples, one or more operations of the 3D image registration may be performed by processing devices of the remote server.

As mentioned, the one or more components of environment 100 may communicate over network 114. Network 114 may be an electronic network. Network 114 may include one or more wired and/or wireless networks, such as a wide area network ("WAN"), a local area network ("LAN"), personal area network ("PAN"), a cellular network (e.g., a 3G network, a 4G network, a 5G network, etc.), or the like. In one non-limiting, illustrative example, the components of environment 100 may communicate and/or connect to network 114 over universal serial bus (USB) or other similar local, low latency connections or direct wireless protocol.

In some embodiments, network 114 includes the Internet, and information and data provided between various systems occurs online. "Online" may mean connecting to or accessing source data or information from a location remote from other devices or networks coupled to the Internet. Alternatively, "online" may refer to connecting or accessing an electronic network (wired or wireless) via a mobile communications network or device. The Internet is a worldwide system of computer networks—a network of networks in which a party at one computer or other device connected to the network can obtain information from any other computer and communicate with parties of other computers or devices. Components of environment 100 may be connected via network 114, using one or more standard communication protocols such that the component may transmit and receive communications from each other across network 114, as discussed in more detail below.

Although various components in environment 100 are depicted as separate components in FIGS. 1A and 1B, it should be understood that a component or portion of a component in environment 100 may, in some embodiments, be integrated with or incorporated into one or more other components. In some embodiments, operations or aspects of one or more of the components discussed above may be distributed amongst one or more other components. Any suitable arrangement and/or integration of the various systems and devices of environment 100 may be used.

While the specific examples included throughout the present disclosure implement 3D image registration in environment 100 to facilitate an ERCP procedure, it should be understood that techniques according to this disclosure may be adapted to register the 3D model to other types of images beyond endoscopic images captured by medical device 120. For example, the 3D model may be registered to a fluoroscopic image of patient anatomy captured during the ERCP to facilitate navigation of the biliary or pancreatic ducts. A fluoroscopic image generally only shows the biliary and pancreatic ducts for a very short period of time when contrast is injected. By using similar techniques described herein, the 3D model may be registered to a fluoroscopic image and a GUI may be generated based on the registration that includes a representation of the biliary and pancreatic ducts that is overlaid on the fluoroscopic image. Additionally, techniques according to this disclosure may be adapted other types of endoscopic medical procedures, such as a percutaneous nephrolithotomy (PCNL) procedure or any other procedure involving endoluminal access to structures that are elastic and deformed during the procedure. For example, to assist the placing of a stent or other similar device to treat a cystic lesion of the pancreas, a 3D image may be registered that includes a portion of the stomach wall and the cystic lesion. A representation of the lesion may be overlaid on an endoscopic image of the stomach wall captured during the procedure at the approximate position the lesion would appear if the lesion was visible to guide a location for penetration to gain access to the lesion for placement of the stent. It should also be understood that the examples above are illustrative only. The techniques and technologies of this disclosure may be adapted to any suitable activity.

FIG. 2A depicts an exemplary medical device 120 of FIGS. 1A and 1B. Medical device 120 may include a handle 202 and an insertion portion 204. Medical device 120 may also include an umbilicus 206 for purposes of connecting medical device 120 to sources of, for example, air, water, suction, power, etc., as well as to image processing and/or viewing equipment, such as MD controller 122.

Insertion portion 204 may include a sheath or shaft 208, and insertion portion 204 may also include a distal tip 210. FIG. 2B depicts an exemplary distal tip assembly 211, which may be positioned at distal tip 210. Referring concurrently to FIGS. 2A and 2B, distal tip assembly 211 may include a substrate 240 (e.g., a rigid or flexible circuit board or other type of board) that may be disposed at least partially within or on an interior core (not shown) of distal tip 210. In examples, substrate 240 is rigid and includes multiple layers.

As shown in FIGS. 2A and 2B, distal tip 210 and distal tip assembly 211 may include one or more imaging devices 212

(e.g., one or more cameras) for capturing images, and distal tip assembly 211 may also include one or more illumination devices 214 (e.g., one or more light emitting diodes (LEDs) or optical fibers) for providing illumination to facilitate image capture and visualization. Distal tip 210 and distal tip assembly 211 may be side-facing. That is, imaging device 212 and illumination devices 214 may face radially outward, perpendicularly, approximately perpendicularly, or otherwise transverse to a longitudinal axis of shaft 208 and distal tip 210. However, this disclosure also encompasses other configurations of distal tips and distal tip assemblies. For example, distal tip and distal tip assembly may be "forward facing" (i.e., distal-facing).

Imaging device 212 and illumination devices 214 may be mounted to substrate 240 by any suitable method, including, but not limited to, wire bonding, surface mount assembly, electro mechanical assembly, and/or plated through-hole technology. Although one imaging device 212 and two illumination devices 214 are depicted in FIGS. 2A and 2B, any suitable number of imaging devices 212 and/or illumination devices 214 may be utilized. Alternatively, imaging device 212 and illumination devices 214 may be combined into a single device. A conduit 242 may house one or more wires or cables that attach to substrate 240 or elements mounted on substrate 240, in order to transmit power and/or signals to and from substrate 240 and/or elements mounted on substrate 240. The wires or cables may be extended through shaft 208 and into handle 202, where the wires or cable may be connected to MD controller 122, e.g., via umbilicus 206. For example, MD controller 122 may transmit signals to cause illumination devices 214 to illuminate, and may receive image signals from imaging device 212 for processing and subsequent display. In some examples, MD controller 122 may also initiate image capture by transmitting signals via the wires or cables housed in conduit to cause imaging device 212 to capture an image.

Elements of position sensing system 104 may also be disposed on substrate 240 and may be mounted according to any of the techniques described above for imaging device 212 and illumination devices 214. For example, at least one or more EM sensor(s) 132, such as a first EM sensor 132a, a second EM sensor 132b, and a third EM sensor 132c, may be disposed on substrate 240. In some examples, first EM sensor 132a, second EM sensor 132b, and third EM sensor 132c may be oriented on substrate as discussed above in detail with reference to FIGS. 1A and 1B. Any alternative number of EM sensor(s) 132 may be utilized, and the three EM sensors 132a, 132b, 132c depicted are exemplary only. As described in detail with reference to FIG. 1B, EM sensors 132a, 132b, and 132c may be receiver devices having the capability of measuring magnetic fields that are, e.g., generated by external device 136, which may facilitate tracking a position and/or orientation of distal tip 210. In other examples, EM sensors 132a, 132b, 132c may be transmitter devices that are capable of generating the magnetic fields.

Based on the inclusion of imaging device 212 in distal tip assembly 211, tracking a position and/or orientation of distal tip 210 utilizing EM sensors 132a, 132b, 132c may enable a position and/or orientation of medical device 120 relative to a 3D surface map generated from images captured by imaging device 212 to be known. This known position and/or orientation may be used along with the 3D surface map as part of the registration process, as discussed below in detail with reference to FIG. 3. While FIG. 2B shows EM sensors 132a, 132b, 132c included within distal tip assembly 211 at distal tip 210 of medical device 120, in other examples, one or more other EM sensors may be positioned at other locations of medical device 120 including within shaft 208 and/or handle 202.

Other optional components of position sensing system 104 may be mounted on substrate 240, including a capacitor 244 and one or more diodes 246. Capacitor 244 may help to reduce noise in a voltage supplying position sensing system 104. For example, capacitor 244 may function as a decoupling capacitor, acting as a low-pass filter for any electromagnetic interference ("EMI") on the supply voltage. One or more diodes 246 may help to provide high voltage protection, such as electrostatic discharge ("ESD") protection. One or more diodes 246 may help to prevent damage to EM sensors 132a, 132b, 132c from static discharge. One or more diodes 246 may, additionally or alternatively, help to provide protection to aspects of imaging device 212.

In some examples, imaging device 212 (e.g., cameras and lenses of imaging device 212) may be calibrated to understand a transformation between an optical coordinate system in which images are captured by imaging device 212 and the spatial coordinate system in which the position and/or orientation of medical device 120 is being determined by position sensing system 104. The calibration may be performed using algorithms commonly known or that may become known in the art, such as "hand-eye" calibration methods. The calibration may be performed during a manufacturing process of medical device 120.

Distal tip assembly 211 may also include an elevator 216 for changing an orientation of a tool (e.g., one of tool(s) 123) inserted in a working channel of medical device 120. Elevator 216 may alternatively be referred to as a swing stand, pivot stand, raising base, or any suitable other term. Elevator 216 may be pivotable via, e.g., an actuation wire or another control element that extends from handle 202, through shaft 208, to elevator 216. Elevator 216 may be pivotable about an axle 217. Axle 217 may be rotatably retained within distal tip assembly 211.

Distal tip assembly 211 may also include components in addition to or in the alternative to the components described above. For example, distal tip assembly 211 also may include additional or alternative sources of lighting and/or additional or alternative imaging components (e.g., additional cameras). Distal tip assembly 211 may also include additional types of sensors, such as moisture sensors, temperature sensors, pressure sensors, or other types of sensors, which may be useful during a medical procedure.

A distal portion of shaft 208 that is connected to distal tip 210 may have a steerable section 218. Steerable section 218 may be, for example, an articulation joint. Shaft 208 and steerable section 218 may include a variety of structures, which are known or may become known in the art.

Handle 202 may have one or more actuators/control mechanisms 220. Control mechanisms 220 may provide control over steerable section 218 or may allow for provision of air, water, suction, etc. For example, handle 202 may include control knobs 222, 224 for left, right, up, and/or down control of steerable section 218. For example, one of knobs 222, 224 may provide left/right control of steerable section 218, and the other of knobs 222, 224 may provide up/down control of steerable section 218. Handle 202 may further include one or more locking mechanisms 226 (e.g., knobs or levers) for preventing steering of steerable section 218 in at least one of an up, down, left, or right direction. Handle 202 may include an elevator control lever 228. Elevator control lever 228 may raise and/or lower elevator 216, via connection between lever 228 and an actuating wire (not shown) that extends from lever 228, through shaft 208, to elevator 216. A port 230 may allow passage of a tool (e.g., one of tool(s) 123) through port 230, into a working channel (not shown) of the medical device 120, through shaft 208, to distal tip 210. Although not shown, handle 202 may also include one or more valves, buttons, actuators, etc. to control the provision of air, water, suction, etc.

In use, an operator may insert at least a portion of shaft 208 into a body lumen of a subject, such as patient P. Distal tip 210 may be navigated to a target site in the body lumen. For an ERCP procedure, distal tip 210 may be inserted into a patient's mouth and navigated down the esophagus through the stomach into the duodenum and to the papilla, where the papilla is a target site for cannulation. The operator may insert a cannulation tool (e.g., one of tool(s) 123, such as a sphincterotome) into port 230, and pass the cannulation tool through shaft 208 via a working channel to distal tip 210. The cannulation tool may exit the working channel at distal tip 210. The operator may use elevator control lever 228 to raise elevator 216 and angle the cannulation tool toward a desired location of the papilla. The operator may use the cannulation tool to perform cannulation. Using the systems, devices, and methods described herein, the positioning of the cannulation tool relative to the desired location of the papilla for cannulation may be facilitated by the display of a GUI. For example, the GUI may include a representation of a positon and/or trajectory of the biliary and pancreatic ducts overlaid on a current image of the papilla captured by imaging device 212 of medical device 120.

FIG. 3 depicts an exemplary process 300 for 3D image registration. In some examples, process 300 may be performed by one or a combination of components of environment 100, such as a computing device of or associated with one of imaging system(s) 106, MD controller 122, and/or separate computing device 112, via the one or more applications executing thereon.

At step 302, process 300 may include receiving a 3D image of anatomy of a patient, such as patient P. The 3D image may be of a particular anatomy (e.g., include particular anatomical structures) dependent on a type of medical procedure. For example, if the medical procedure to be performed is an ERCP procedure, the 3D image may be a 3D image of the upper gastrointestinal (GI) tract, including the esophagus, stomach, duodenum, and biliopancreatic anatomy. In some examples, an operator may select the 3D image from among a plurality of 3D images to be used for 3D image registration.

Preoperative imaging may be performed on patient P weeks, days, or same-day prior to the procedure. In such examples, the 3D image may be a preoperative 3D image captured by one of the preoperative imaging systems of imaging system(s) 106, such as a CT image, an MRCP image, a US image, etc. The preoperative 3D image may be received from one of imaging system(s) 106 that captured the 3D image or from data storage system 108.

In other examples, intraoperative imaging may be performed on patient P during the procedure. In such examples, the 3D image may be an intraoperative 3D image, captured by one of the intraoperative imaging systems of imaging system(s) 106. The intraoperative imaging systems may include non-3D imaging modalities that may be used in order to reconstruct a 3D image, including transabdominal US, endoscopic US, or fluoroscopy. Additionally or alternatively, the intraoperative imaging systems may include 3D imaging modalities such as fluoroscopic cone beam CT, c-arm based tomography, and/or digital tomosynthesis.

In some examples, when the preoperative and/or intraoperative imaging is performed, a contrast agent or other substance (e.g., secretin) may be administered to patient P to help enhance the appearance of particular anatomy in the 3D image, such as the biliopancreatic ducts. Additionally, if the preoperative and/or intraoperative imaging has been ordered specifically for the procedure, patient P may be positioned in a same or similar pose for imaging as patient P will be or is currently placed for the ERCP procedure. A same or similar pose may facilitate registration. However, preoperative images may often be ordered by a different physician and/or for a different purpose (e.g., for diagnostic purposes), and thus patient P may have a different pose for preoperative imaging than for when patient P undergoes the medical procedure. Accordingly, registration techniques described herein may adjust or account for the different pose present in the 3D image.

Optionally, patch 134, or at least a portion of components of patch 134 including radiopaque markers, MRI markers, or other similar markers, may be applied to patient P prior to the preoperative and/or intraoperative imaging. Resultantly, the 3D image received at step 302 may include the markers of patch 134 in the 3D image, which may provide an additional alignment feature for registration.

At step 304, process 300 may include processing the 3D image to extract a 3D model that identifies a plurality of anatomical structures in the anatomy, including one or more anatomical structures of interest for a medical procedure. For example, when the medical procedure is an ERCP procedure, the 3D model may identify and isolate (e.g., segment) anatomical structures of at least the upper GI tract and the biliopancreatic tree, including the esophagus, stomach, pyloric sphincter, duodenum, biliary ducts (e.g., common bile duct, cystic duct, and hepatic ducts), liver, pancreatic duct, and pancreas. The biliopancreatic tree, and in particular the biliary and pancreatic ducts, may be the anatomical structures of interest. In addition to the anatomical structures of the upper GI tract and biliopancreatic tree, one or more other anatomical structures may be identified, such as ribs, spine and/or other structures that may be correlated to intra-operative images, including endoscopic images captured by medical device 120 and/or fluoroscopic images, for use during registration, as described in detail below.

In some examples, the 3D image may be processed via manual segmentation, whereby the operator may manually identify and label each of the anatomical structures. For example, the 3D image may be displayed e.g., via one of display(s) 110, and the operator provide input via the one of display(s) 110 and/or an associated computing device (e.g., computing device of one of imaging systems 116 or computing device 112) to manually label the anatomical structures. In other examples, the 3D image may be processed via computational methods commonly used in computer vision, machine learning, and/or other image processing techniques for isolating structures. The computational methods may be entirely automatic and/or may be used in conjunction with operator input to e.g., confirm or modify/correct anatomical features.

As one example computational method, a computer vision model or machine learning model (hereinafter referred to as "the model") may be trained and implemented to predict anatomical structures present in the 3D image. The model may be trained by one of the components in environment 100 that may implement the model, such as computing devices of or associated with imaging system(s) 106, computing device 112, and/or MD controller 122. In other examples, the model may be trained by a third party system, and the model may be provided to the component in environment 100 that may implement the model for execution. To train the model, training data may be received and processed to generate (e.g., build) a trained model for predicting anatomical structures present in the 3D image. The training data may include 3D training images of patient anatomy. The 3D training images may include multiple image modalities (e.g., CT images, MRCP images, US images, etc.). The training data may be generated, received, or otherwise obtained from internal and/or external resources. In some examples, the training data may also include synthetic 3D training images of patient anatomy.

Generally, a model includes a set of variables, e.g., nodes, neurons, filters, etc., that are tuned, e.g., weighted or biased, to different values via the application of the training data. In some examples, supervised, unsupervised, semi-supervised, and/or reinforcement learning processes may be implemented to train the model. In some embodiments, a portion of the training data may be withheld during training and/or used to validate the trained model.

When supervised learning processes are employed, labels or annotations corresponding to the 3D training images (e.g., labels or annotations corresponding to the training data) may facilitate the learning process by providing a ground truth. For example, the labels or annotations may indicate anatomical structures present in the 3D image. Training may proceed by feeding a 3D training image (e.g., a sample) from the training data into the model, the model having variables set at initialized values, e.g., at random, based on Gaussian noise, a pre-trained model, or the like. The model may output predicted anatomical structures present for the sample. The output may be compared with the corresponding label or annotation (e.g., the ground truth) to determine an error, which may then be back-propagated through the model to adjust the values of the variables. This process may be repeated for a plurality of samples at least until a determined loss or error is below a predefined threshold. In some examples, some of the training data may be withheld and used to further validate or test the trained model.

For unsupervised learning processes, the training data may not include pre-assigned labels or annotations to aid the learning process. Rather, unsupervised learning processes may include clustering, classification, or the like to identify naturally occurring patterns in the training data. K-means clustering or K-Nearest Neighbors may also be used, which may be supervised or unsupervised. Combinations of K-Nearest Neighbors and an unsupervised cluster technique may also be used. For semi-supervised learning, a combination of training data with pre-assigned labels or annotations and training data without pre-assigned labels or annotations may be used to train the model.

When reinforcement learning is employed, an agent (e.g., an algorithm) may be trained to make a decision regarding the anatomical structures included in the sample from the training data through trial and error. For example, upon making a decision, the agent may then receive feedback (e.g., a positive reward if the predicted anatomical structures are in fact the anatomical structures present in the sample), adjust its next decision to maximize the reward, and repeat until a loss function is optimized.

Once trained, the trained model may be stored and subsequently applied by one of the components of environment 100. For example, the trained model may receive, as input data, the 3D image received at step 302. The trained model may output predicted anatomical structures present (e.g., included) in the 3D image. A 3D model may be extracted based on the output that identifies (e.g., isolates) the anatomical structures. The 3D model with isolated anatomical structures may then be displayed (e.g., via one of display(s) 110). In some examples, operator input via touch or other inputs to the one of display(s) 110 and/or an associated computing device (e.g., a computing device of one of imaging system(s) 106, MD controller 122, and/or computing device 112) may be received as feedback to the prediction. For example, an operator may confirm and/or correct an anatomical structure identified. The feedback may be used to retrain the model by adjusting values of one or more variables of the model, for example.

As described in more detail below with reference to FIG. 4, in some examples, the 3D model extracted at step 304 may be incomplete. For example, one or more of the plurality of anatomical structures may be incomplete. In such examples, an estimated model of the incomplete anatomical structures may be computed.

By identifying (e.g., isolating and/or segmenting) the anatomical structures, the extracted 3D model may allow for the visualization of certain anatomical structures that may otherwise not be visible during the medical procedure, such as the biliary and pancreatic ducts during the ERCP. Additionally, the identified anatomical structures may serve as landmarks to facilitate accurate image fusion and registration, described in detail below.

At step 306, process 300 may include receiving a plurality of images of a body lumen of patient P captured by imaging device 212 of medical device 120 as medical device 120 is inserted into and navigated toward a target site through the body lumen during the medical procedure. At least one of the images may include a current image of the target site. For example, for an ERCP procedure, medical device 120 may be inserted into patient P's mouth and navigated down the esophagus through the stomach into the duodenum and to the papilla, where the papilla may be the target site for cannulation. Thus, at least one of the images received may include a current image of the papilla. The images may be received in real-time as medical device 120 is navigated toward the target site, and may be displayed via one of display(s) 110 to enable the operator to visualize the body lumen and target site as medical device 120 is navigated toward the target site.

At step 308, process 300 may include receiving spatial information for medical device 120 from position sensing system 104. In some examples, the spatial information for medical device 120 may be received in real-time as medical device 120 is being navigated toward the target site to enable correspondence with the images captured by imaging device 212 as medical device 120 is navigated toward the target site. The spatial information for medical device 120 may include a position and/or orientation of medical device 120, and more specifically at least a position and/or orientation of distal tip 210 and/or distal assembly 211 of medical device 120, described and shown in FIGS. 2A and 2B. For example, the position and/or orientation of distal tip 210 of medical device 120 may be determined based on the signals received from EM sensors 132a, 132b, 132c indicating a strength of (e.g., a voltage induced by) the magnetic field generated by external device 136 that is detected by patch EM sensor(s) 135. The position and/or orientation of any other components of medical device 120 may also be determined if additional EM sensor(s) 132 are disposed therein (e.g., if EM sensor(s) 132 are positioned in shaft 208 and/or handle 202).

Optionally, spatial information may also be received for patient P from position sensing system 104. For example, if patch 134 is locally applied to patient P, position and/or orientation of patient P may be determined by PSS controller 130, for example, based on signals received from patch EM sensor(s) 135, indicating a strength of (e.g., a voltage induced by) the magnetic field generated by external device 136 that is detected by patch EM sensor(s) 135.

At step 310, process 300 may include processing the plurality of images of the body lumen and the spatial information for medical device 120 to generate a 3D surface map of at least a portion of the body lumen. The 3D surface map may include a portion of the plurality anatomical structures that were identified (e.g., isolated or segmented) in the extracted 3D model without the anatomical structures of interest. Continuing with the example where the medical procedure is an ERCP procedure, the 3D surface map may map the upper GI tract and anatomy surrounding the biliopancreatic ducts (e.g., the wall of duodenum and the papilla). However, the biliopancreatic ducts themselves are not mapped in the 3D surface map because the biliopancreatic ducts are not visible to imaging device 212, and thus not captured in the images, based on the wall of the duodenum and the papilla effectively blocking or preventing visualization of the ducts.

As medical device 120 is navigated toward the target site, the images captured by imaging device 212 of medical device 120 and the corresponding spatial tracking information for medical device 120, including at least a position and/or orientation of distal tip 210 of medical device 120, may be used to generate the 3D surface map. The spatial tracking information may include at least a position and/or orientation of distal tip 210 of medical device 120, as determined by position sensing system 104 using EM sensor(s) 132. In some examples, information from other positioning systems, such as light detection and ranging (LIDAR), ultrasonic distance measurement (via pulse-echo or transmit-receive methods), stereoscopic cameras, fluoroscopic image, intra-procedural 3D radiographic image, structured light image, etc., may be utilized to generate the 3D surface map.

In any embodiments where environment 100 does not include position sensing system 104 and/or other similar independent spatial tracking system, the position and/or orientation of imaging device 212 at distal tip 210 of medical device 120 may need to be identified in relation to the anatomical structures while simultaneously mapping the anatomical structures as 3D surfaces. In some examples, the position and/or orientation of imaging device 212 may be identified through the application of a Simultaneous Localization and Mapping (SLAM) algorithm. The SLAM algorithm may incorporate inputs from the other sensors and/or imaging modalities. If the SLAM algorithm is utilized, at least the anatomical structures serving as landmarks for use in registration may be mapped continuously as medical device 120 navigates through the body lumen, such that relative positions of each anatomical structure is known (e.g., a continuous path between each of the anatomical structures may be mapped).

In addition to (e.g., as part of or in conjunction with) the generation of the 3D surface map, anatomical structures may be identified. For example, the anatomical structures identified may correspond to anatomical structures identified in the extracted 3D model at step 304 for use in registration. In some examples, a distinctiveness in appearance and/or geometry of a given anatomical structure may determine which of the identified anatomical structures may be utilized as part of the 3D surface map to serve as landmarks to, e.g., facilitate image registration described below.

Continuing with the example where the medical procedure is an ERCP procedure, as medical device 120 passes through the upper GI tract (e.g., down esophagus through the stomach and into duodenum), the esophagus, fundus, body of the stomach, pyloric antrum, pylorus, pyloric sphincter, duodenal bulb, and or duodenum may be identified as distinct anatomical structures. In some examples, different anatomical regions and anatomical structures within each region may identified based on unique appearance and/or morphological form of the regions and/or structures. For example, the esophagus may be identified based on the long, straight, tubular form of the esophagus. Portions of the stomach may be identified by the appearance and/or shape of the gastric rugae, or the more open, bulbus shape of the fundus. The pyloric sphincter may be identified by the shape of a small opening at the end of a larger cavernous volume. The duodenum may be identified by the ring-like folds circumscribing the tubular wall, or the appearance of intestinal villi. Additionally, identification of the anatomical structures may be deduced by spatial proximity to other anatomy, and/or by the temporal sequence by which the anatomical features appear during the procedure as medical device 120 is navigated through the body lumen to the target site.

In other examples, the different regions of the upper GI tract may be mapped as a single structure without separate classification. However, if the 3D surface map is incomplete, it may be useful to identify at least a portion of anatomical structures (e.g., the structures serving as landmarks) that are mapped to enable those portion of anatomical structures to be matched with the corresponding anatomical structures identified (e.g., isolated or segmented in) 3D model during registration. Additionally, in cases where deformation is compensated for during registration, at least the anatomical structure at the target site (e.g., the papilla) may be identified separately.

The anatomical structures may be identified using one or a combination of identification techniques. For examples, using a first identification technique, the anatomical structures may be identified by providing the images (e.g., 2D image data) as input to a trained computer vision or machine learning model. For example, a computer vision or machine learning model may be trained and implemented to predict anatomical structures in images captured by medical device 120 (e.g., in 2D images) using similar techniques described above at step 304 for predicting anatomical structures in 3D images. In this aspect, however, the training data includes real and/or synthetic 2D endoscopic images rather than real and/or synthetic 3D images, such as CT images, MRCP images, US images, etc. Distinct anatomical form or appearance of the anatomical structures, spatial proximity to other anatomical structures, and/or temporal sequence by which anatomical structures appear during the medical procedure may be learned as part of training. Therefore, each image received may be provided as input data to the trained model, and the trained model may output one or more predicted anatomical structures in the image.

As previously discussed, as medical device 120 is navigated toward the target site through the body lumen, the images of the body lumen and target site may be displayed in real-time by one of display(s) 110. In some examples, an indication of the predicted anatomical structures output by the trained model may be displayed in association with a location of the anatomical structures in the image displayed.

Additionally or alternatively, a prompt may be generated and displayed requesting manual input from the operator to, e.g., identify or confirm when a known anatomical structure has been reached by medical device 120 and is visualized in an image displayed. For example, the trained model may be executed to predict an anatomical structure, such as the cardia of the stomach, and a prompt may then be generated and displayed that instructs the operator to confirm the anatomical structure identified in the image is in fact the cardia. The prompt may be displayed adjacent to the indication of the predicted anatomical structure of cardia. In other examples, rather than employing a computer vision or machine learning model to automatically identify or predict anatomical structures, the operator may instead be prompted to identify at least a subset of anatomical structures displayed in the images. The subset of anatomical structures may include landmarks to facilitate accurate image registration, discussed in detail below.

Additionally or alternatively, using a second identification technique, the anatomical structures may be identified by first mapping a geometric shape of an anatomical structure as 3D surfaces (e.g., forming part of the 3D surface map), and identifying the anatomical structure using the 3D surface map. For example, any anatomical structures identified by geometric shape may be mapped as 3D surfaces using the images captured by medical device 120 and spatial information from EM sensor(s) 132, other optional sensors incorporated in medical device 120, such as an accelerometer, and/or information from other positioning systems, such as light detection and ranging (LIDAR), ultrasonic distance measurement (via pulse-echo or transmit-receive methods), stereoscopic cameras, fluoroscopic image, intra-procedural 3D radiographic image, structured light image, etc.

In some instances, particularly when imaging device 212 of medical device 120 has a limited field of view, spatial information (e.g., determined by position sensing system 104) and the geometry of distal tip 210 of medical device 120 may also be used to generate a contact map that estimates the geometry of the anatomical structure when the position of movement of distal tip 210 is confined. In anatomical structures with easily deformable boundaries, the contact map may rely on measuring deceleration of distal tip 210 to deduce a wall or boundary of tissue of the anatomical structures.

In some instances, at least one anatomical structure may be necessary to identify and include in the 3D surface map based on the medical procedure, such as the papilla for an ERCP procedure. For a patient that has pancreas divisum, the major and minor papillae may be separately identified during the ERCP procedure. Once medical device 120 has reached the papilla, the papilla may be automatically identified using one or a combination of the above-described identification techniques. Additionally, in some examples, registration performed at step 312, described in detail below, may begin as the 3D surface map is being generated and before the papilla is identified. In such examples, the operator may be guided to an approximate position of the papilla if the registration is partially complete. For example, visual indicators, such as arrows or other similar directional graphical components, may be provided for display on an image being captured by imaging device 212 and displayed on one of display(s) 110 to prompt the operator to, e.g., use one of knobs 222, 224 to control steerable section 218. Additionally, once the papilla is identified, a visual indication of a location of the identified papilla may be provided for display on the current image being captured by imaging device 212 and displayed on one of display(s) 110. Alternatively, if the identified papilla is no longer in the field of view, one or more visual indicators, similar to the above-discussed visual indicators, may be provided for display to direct the operator back to the location of the identified papilla. In some examples, the operator may be requested, via a prompt or notification, to confirm the automatically identified papilla.

In another aspect, the operator may be prompted to manually identify the papilla by clicking, tapping, or otherwise selecting the papilla within the displayed image. In other examples, the application may wait until a cannulation tool (e.g., one of tool(s) 123 inserted into medical device 120 via working channel and exiting the working channel at distal tip 210) is inserted through the papilla to identify the papilla. For example, the application may identify the papilla based on where the cannulation tool intersects tissue in the current image of the target site, and/or where a tip of the cannulation tool is located (e.g., the tool being fluoro-opaque) on the fluoroscopy image captured during the medical procedure.

In other examples, as the 3D surface map is being generated and anatomical structures are identified, a mapping progress indication may be generated and displayed. For example, the mapping progress indication may include a percentage or a graphical component (e.g., pie chart, bar graph, etc.) indicative or suggestive of the percentage or confidence of sufficient mapping data (e.g., portion of anatomical structures identified) that can be correlated to the 3D model. Additionally or alternatively, the 3D surface map itself in its current state may be displayed to inform the operator of a level of completeness and/or a level of accuracy of the map.

If there is inadequate image or other mapping data, a notification may be generated requesting additional data, and/or indicating that there may be a low confidence in the registration accuracy if no further data is collected. As one example, if one or more landmarks (i.e., an insufficient number of landmarks) have not been identified and/or the image in which one or more of the landmarks are identified is not clear, the image and/or mapping data may be inadequate. In response, a notification may be generated that includes a prompt to instruct an operator to move medical device 120 to capture another image of the one or more landmarks that are missing and/or unclear. Additionally, the prompt may instruct the operator to confirm or manually identify the missing and/or unclear landmarks. As another example, a notification may be generated that includes a prompt to instruct the operator to move medical device 120 to return to view landmarks that are easiest to identify, and/or have the operator confirm or manually identify these landmarks.

In some examples, where intraoperative 3D imaging is available, an intraoperative 3D image (e.g., different from the 3D image received at step 302) may be captured during the medical procedure to more quickly and/or accurately generate the 3D surface map. The intraoperative 3D image may also help to correct or account for deformation or displacement due to differences in patient position or presence of medical device 120 in the body lumen. Capturing and utilizing the intraoperative 3D image to supplement the mapping data may reduce an amount of time spent collecting data with medical device 120, as only a minimal 3D surface mapping data may be needed to register a 3D model that has already been corrected for deformations. Resultantly, a duration of the overall procedure may also be reduced while further increasing accuracy. The intraoperative 3D image may be taken when medical device 120 (i.e., distal tip 210) is positioned in the duodenum to accurately depict deformation or displacement from presence of medical device 120, either before or after identifying the papilla.

At step 312, process 300 may include registering the 3D model to the patient using the 3D surface map and the spatial information for medical device 120. The registration may include determining a transformation matrix. Registration may begin while the 3D surface map is being generated, but may not be completed until particular structures are mapped in the 3D surface map. The structures being mapped may include the duodenum and/or the papilla when the medical procedure is an ERCP procedure. The spatial information for medical device 120 may include the position and/or the orientation of medical device 120 relative to the 3D surface map. Additionally, if spatial information for patient P is optionally received in addition to the spatial information for the medical device received from position sensing system 104 at step 308, the spatial information for patient P may also be used to register the 3D model to patient P to, e.g., account for any movement, including respiratory movement of patient P.

In some examples, the registration performed may be an automatic registration using one or more algorithms. For example, and as described in more detail with reference to FIG. 5, automatic registration may include an initial registration based on an alignment or matching of anatomical structures in the 3D surface model to corresponding anatomical structures identified in the 3D model. For example, for image registration performed for an ERCP procedure, the extracted 3D model may identify anatomical structures of the upper GI tract and the biliopancreatic tree (among other structures). Similarly, for image registration performed for the ERCP procedure, the 3D surface map may include anatomical structures of at least a portion of the upper GI tract, as well as the papilla. The anatomical structures of at least the portion of the upper GI tract included in the 3D surface map may be aligned or otherwise matched to corresponding anatomical structures of the upper GI tract in the 3D model. Based on the initial registration, a transformation matrix that compensates for deformations and/or displacements of the anatomical structures may then be computed by weighting the known susceptibility of certain areas of the anatomy to deformation, as well as correlating deformation or displacement from one anatomical structure to another. In some examples, the spatial information received from position sensing system 104 for medical device 120 (and, optionally, for patient P) may be used to estimate the deformations and/or displacements.

In other examples, the automatic registration may be performed using a computer vision or machine learning model that is trained and implemented to perform registration. In further examples, the registration may be a manual registration and/or a combination of automatic registration and manual registration. Additionally, in any of these examples, the registration process may further include determination of a confidence level and/or a percentage of registration accuracy.

The transformation matrix determined may be applied to the 3D model to transform the 3D model. The 3D model to which the transformation matrix is applied may be the 3D model that was extracted at step 304. Resultantly, the transformed 3D model may now account for any deformations and/or displacements of the anatomical structures due to patient position, presence of medical device 120, and/or physiological functions to, e.g., align the anatomy within the 3D image to the patient's current anatomy.

Once the 3D model is registered to the patient, at step 314, process 300 may include generating a GUI that overlays a representation of a position or a trajectory of the one or more anatomical structures of interest on the current image of the target site. For example, for the ERCP procedure, a representation of the biliary ducts (or at least the common bile duct of the biliary ducts) and/or the pancreatic duct extending from the papilla may be overlaid on the live image of the papilla captured by imaging device 212 of medical device 120. The representation of the biliary ducts and/or the pancreatic duct may be overlaid at the approximate position the ducts would appear if the ducts were visible through imaging device 212 (e.g., creating an augmented reality image).

In some examples, the representation may be a portion of the transformed 3D model itself including the anatomical structures of interest. In other examples, the representation may be in the form of a wireframe model, centerlines, a sequence of discs positioned orthogonal to the centerline, tubular structures, etc., that may be generated using the transformed 3D model. In additional examples, the overlay may use varying size, color, and/or appearance to indicate an approximate size (e.g., diameter) of the anatomical structures of interest. In further examples, the overlay may include features to indicate a confidence interval or potential error in the alignment of the overlay (e.g., which may be determined as part of registration process at step 312). Example graphical user interfaces including overlays are shown in FIGS. 6B and 6C below.

At step 316, process 300 may include causing display of the GUI on a display device. Display device may be one of display(s) 110 that is displaying the current image of the target site. Resultantly, display of the GUI may cause the representation of the position or the trajectory of the one or more anatomical structures of interest to be overlaid on the current image of the target site. For example, the GUI may overlay the representation of the position or trajectory of the biliary ducts and/or pancreatic duct to be overlaid on the current image of the papilla. Based on the GUI displayed, the operator may confirm and/or adjust the position of medical device 120 (e.g., extending or retracting distal tip 210 and/or manipulating one or more of the knobs 222, 224 to control steerable section 218) and/or adjust the tool for performing cannulation (e.g., one of tool(s) 123 using elevator 216), for example, to help ensure alignment with the particular duct to be cannulated.

After the GUI is displayed and as cannulation facilitated by the GUI is initiated, the papilla or wall of the duodenum may be intentionally moved or displaced in order to access the papilla or incidentally moved or displaced as the tool for cannulation is advanced through the papilla. In some embodiments, to compensate for the movement and/or displacement, the overlaid representation may be locally deformed to match the movement at the papilla to provide a more accurate estimate of the duct position and/or trajectory as the duct position and/or trajectory changes during the cannulation process. The movement at the papilla may be determined by tracking a position of the papilla using a machine learning algorithm or other computer vision techniques. In some examples, if an operator repositions medical device 120 during cannulation, a fluoroscopic image captured by one of imaging system(s) 106 may inform how shaft 208 and/or steerable section 218 have moved as additional contextual information to understand how the papilla and/or the wall of the duodenum has shifted. Additionally, in examples where the representation of the position or trajectory of the biliary and/or pancreatic ducts is not a portion of the 3D transformed image itself but rather a centerline form, among other similar examples, the representation may not need deformation (e.g., based on the implication that the type of representation communicates the duct position and trajectory is approximate and not exact). Alternatively, the GUI may be removed from display once the tip of the cannulation tool contacts the wall of the duodenum and/or enters the papilla.

In further embodiments, as one or more other tools (e.g., from tool(s) 123), such as cholangioscopes, catheters, balloons, stent delivery systems, forceps, baskets, nets, biopsy needles, guide wires, etc., are advanced through one of the ducts following cannulation, the GUI may be updated in real-time. For example, the GUI may be updated in real-time to overlay a representation of one or more tool(s) 123 advancing through the representation of the respective duct, if spatial information (e.g., a position and/or an orientation) of tool(s) 123 is tracked. The position of tool(s) 123 may be tracked using an EM-based tracking system, such as position sensing system 104. For example, tool EM sensor(s) 133 similar to EM sensor(s) 132 and patch EM sensor(s) 135 may be positioned, e.g., at a distal tip of tool(s) 123. Additionally or alternatively, the position of tool(s) 123 may be tracked using a shape sensing tracking system (through optical fibers), accelerometers, and/or by fluoroscopic imaging.

In some examples, a length of tool(s) 123 may be represented using the tracked spatial information and a known length of tool(s) 123 to depict tool(s) 123 from a third person point of view (POV) as tool(s) 123 advance through the desired duct. The position and/or trajectory of tool(s) 123 may be represented in the overlaid portion on the current image at the target site of the papilla. In other examples, a distal tip of tool (s) 123 may be represented using the tracked spatial information to depict tool(s) 123 from a first person POV as tool(s) 123 advance through the desired duct. For example, the position and/or trajectory of tool(s) 123 may be represented in the overlaid portion on the current image at the target site of the papilla. Additionally or alternatively, if one of tool(s) 123 is a cholangioscope, the representation of the duct into which the cholangioscope is advancing through may be overlaid onto a current 2D image captured by an imaging device of the cholangioscope (e.g., similar to imaging device 212 of medical device 120). Overlaying the representation of the duct may help to allow the operator to see where the duct leads beyond visual obstructions in the duct, such as stones, tumors, etc., that otherwise may prevent those portions of the duct to be visualized by the imaging device of the cholangioscope.

The visualized and/or tracked positions of obstructions, stents, treatments, biopsy samples, tool paths, or the like may be recorded and referenced for follow up procedures or imaging. For example, the recorded positions may be provided to data storage system 108 for storage in association with other images and information of patient P. This information may be used to plan future procedures, monitor patient outcomes, and/or explain the procedure to the patient, or may be included as part of research or academic disclosure.

Accordingly, certain embodiments may be performed for image registration. Process 300 described above is provided merely as an example, and may include additional, fewer, different, or differently arranged steps than depicted in FIG. 3.

FIG. 4 depicts an exemplary process 400 for extracting a 3D model for use in image registration. Process 400 may be performed by one or more of the components of environment 100, for example, via an application executing thereon that is configured to perform at least operations associated with processing a 3D image to extract a 3D model. In some examples, process 400 may be performed by a computing device of or associated with one of imaging system(s) 106 that captured a 3D image from which the 3D model may be extracted. In other examples, process 400 may be performed by MD controller 122 of medical device system 102. In further examples, process 400 may be performed by computing device 112. Process 400 may be used to perform at least a portion of step 304 of process 300 to extract the 3D model.

At step 402, process 400 may include receiving a 3D image of anatomy of a patient, such as patient P. The 3D image may be of a particular anatomy (e.g., include particular anatomical structures) dependent on a type of medical procedure. The 3D image may be a preoperative 3D image captured by one of the preoperative imaging systems of imaging system(s) 106 prior to the medical procedure or, if available, the 3D image may be an intraoperative 3D image captured by one of intraoperative imaging systems of imaging systems during the medical procedure. This step 402 may be the same or similar to step 302 of process 300, described above in greater detail with reference to FIG. 3.

At decision step 404, process 400 may include a determination of whether an image quality of the 3D image received at step 402 meets a predefined threshold. The predefined threshold may be based on a minimum image quality level necessary for extracting the 3D model from the 3D image, such that anatomical structures, including one or more anatomical structures of interest, may be identified (e.g., may be isolated or segmented). If at decision step 404, the image quality of the 3D image is determined to meet (e.g., is at or above) the predefined threshold, process may proceed to step 406.

Otherwise, if at decision step 404, a determination is made that the image quality of the 3D image does not meet (e.g., is below) the predefined threshold, process 400 may return to step 402, where another 3D image of the anatomy of the patient is received. In some examples, the other 3D image may be another preoperative 3D image that was captured by one of imaging system(s) 106 and stored in data storage system 108. For example, the operator may select the other 3D image from a plurality of 3D images of patient P that are available in data storage system 108. In other examples, the operator may receive a notification that the 3D image is insufficient and may order additional preoperative imaging for patient P and/or the additional preoperative imaging may be automatically ordered. In further examples, if available, 3D intraoperative imaging may be performed during the medical procedure to capture the other 3D image. The other 3D image may then be analyzed to determine whether the image quality threshold is met. Steps 402 and 404 may continue to be repeated until a 3D image is received that is determined to meet the minimum image quality level. Then, process 400 may then move to step 406.

At step 406, process 400 may include processing the 3D image to extract the 3D model. The 3D model may identify a plurality of anatomical structures in the anatomy, including one or more anatomical structures of interest for a medical procedure. This step 406 may be the same or similar to step 304 of process 300, described above in detail with reference to FIG. 3.

At decision step 408, process 400 may include a determination of whether the 3D model extracted at step 406 meets a predefined completeness threshold. The predefined completeness threshold may be based on a minimum number and/or type of complete anatomical structures identified, including a minimum number and/or type of complete anatomical structures serving as landmarks for registration (e.g., to ensure an accurate registration). For example, for an ERCP procedure, the predefined completeness threshold may include, at minimum, a complete common bile duct and a complete pancreatic duct, among other types of complete anatomical structures. If the 3D model extracted at step 406 is determined to meet (e.g., is at or above) the completeness threshold at decision step 408, process 400 may end at step 410. In some examples, the 3D model extracted may be transmitted to another system and/or computing device within environment 100 for processing, analysis, storage, display, etc. Otherwise, if the 3D model extracted at step 406 is determined to not meet (e.g., is below) the completeness threshold at decision step 408, process 400 may proceed to step 412.

At step 412, process 400 may include estimating one or more incomplete anatomical structures. An estimated model of incomplete anatomical features may be calculated based on available anatomy information. As one example, the common bile duct and the pancreatic duct identified in the extracted 3D model may be incomplete. For example, the last few millimeters of the common bile duct and the pancreatic duct where the ducts flow into the duodenum (e.g., the short section of the ducts) may not be visible on 3D CT and/or MRCP images, for example, because the papilla constricts around this section of the ducts. The papilla constricting around this section of the ducts may result in surrounding fluid that acts as a contrast agent for the 3D CT and/or MRCP image. Because this section of the ducts is not visible on 3D CT and/or MRCP images, this section of the ducts may not be identified (e.g., isolated or segmented) in the 3D model extracted from the 3D image. To complete the 3D model, the incomplete section of the ducts may be estimated or approximated by extrapolating the ducts to where they intersect with the duodenum based on a trajectory of the ducts prior to the incomplete section.

In some examples, the operator may be asked to confirm whether the estimations of the one or more incomplete anatomical structures are reasonable estimations. For example, the 3D model including the estimated incomplete anatomical structures may be provided for display along with a prompt seeking confirmation. The prompt may be displayed in association with the estimated incomplete anatomical structure (e.g., on one or more display(s) 110). Additionally or alternatively, the operator may be enabled to manually estimate the trajectory of the incomplete anatomical structures. For example, the operator may provide the estimated trajectory via touch or other inputs to the one of display(s) 110 and/or an associated computing device (e.g., a computing device of one of imaging system(s) 106, MD controller 122, and/or computing device 112).

Accordingly, certain embodiments may be performed for processing a 3D image to extract a 3D model. Process 400 described above is provided merely as an example, and may include additional, fewer, different, or differently arranged steps than depicted in FIG. 4.

FIG. 5 depicts an exemplary process 500 for registering a 3D model to the patient. Process 500 may be performed by one of components of environment 100, such as MD controller 122 of medical device system 102 or computing device 112, via an application executing thereon that is configured to perform at least operations associated registration. Process 500 may be used to perform at least a portion of step 312 of process 300 to register the 3D model, where the registration includes the determination of the transformation matrix.

At step 502, process 500 may include matching one or more of the portion of the plurality of anatomical structures included in the 3D surface map generated at step 310 of process 300 to corresponding anatomical structures in the 3D model extracted at step 304 of process 300. Continuing with the example for an ERCP procedure, the extracted 3D model may identify or isolate anatomical structures of the upper GI tract and the biliopancreatic tree (among other structures), and the 3D surface map include at least a portion of the anatomical structures of the upper GI tract as well as the papilla. At step 502, at least the portion of the anatomical structures of the upper GI tract included in the 3D surface map may be matched or aligned to corresponding anatomical structures of the upper GI tract identified in the extracted 3D model.

At step 504, process 500 may include performing an initial registration based on the matching. In some examples, the initial registration may be a rigid image registration using methods and/or processes commonly known or that may become known in the art. For example, parameters of a transformation matrix may be identified to map voxel positions in the 3D model to the 3D surface map. In some examples, the initial registration may require a match and/or alignment of a predefined number (or type) of anatomical structures. For example, at least three anatomical structures may be matched or aligned.

The initial registration performed may assume the anatomical structures are rigid structures. However, anatomical structures are not rigid structures. Anatomical structures in the 3D surface map may be deformed and/or displaced. For example, the deformation and/or displacement may be based on how patient P is positioned during the medical procedure in relation to how patient P was positioned when the 3D image used to extract the 3D model was captured, based on the introduction of medical device 120 into the body lumen during the medical procedure, and/or based on other naturally occurring physiological functions, e.g., respiration, of the anatomy. For example, the orientation of the duodenum and pylorus may appear to be rotated relative to the axis of the esophagus between the 3D surface map and the 3D model, which may occur when the 3D model was captured with the patient in a different position from the position of the patient during the ERCP procedure. As another example, a shape of anatomical structures like the stomach may change drastically as the walls collapse or expand from changes in internal pressure, but the common bile duct and pancreatic duct may not be deformed or displaced by the same magnitude.

To improve an accuracy of registration, the deformations and/or displacements of the anatomical structures may be compensated for. For example, at step 506, process 500 may include determining a deformation compensation. The deformation compensation may be determined by weighting the known susceptibility of certain areas of the anatomy to deformation, as well as correlating deformation or displacement from one anatomical structure to another.

For example, knowing the shape of the stomach may be deformed or displaced at a significantly greater magnitude than the common bile and/or pancreatic ducts, any deformation may be compensated for at a lesser magnitude for transformation parameters corresponding to the common bile and/or pancreatic ducts (i.e., compared to the stomach). For example, based on an assumption that the short section of the common bile and/or pancreatic ducts are elastic but respective remainders of the ducts are relatively fixed, a position or trajectory of the respective fixed portions of the ducts may be continuously derivable (e.g., using a spline function).

As another example, the other structures identified in the extracted model, such as the spine, ribs, etc., may inform a susceptibility to deformation. For example, if an area of the upper GI tract has another anatomical structure nearby, the area may be more rigid and less susceptible to deformation.

As a further example, if the orientation of the duodenum and pylorus appear to be rotated relative to the axis of the esophagus, transformation parameters corresponding to the biliopancreatic tree may be adjusted correspondingly, under the assumption that the biliopancreatic tree will follow a similar rotation. In some examples, the assumption may be learned from a training set of patient images analyzed to identify a typical position of the biliopancreatic tree based on a given orientation of the duodenum and pylorus relative to an axis of the esophagus.

In some examples, the spatial information for medical device 120 from position sensing system 104 may be used to estimate the deformations and/or displacements. For example, the position and/or orientation of distal tip 210 and/or any other locations of medical device 120 in which EM sensor(s) 132 may be positioned may be used to estimate the deformations and/or displacements. Additionally or alternatively, the position of patient P from patch EM sensor(s) 135 may be used to estimate the deformations and/or displacements.

At step 508, process 500 may include determining a transformation matrix based on the initial registration and the deformation compensation. In some examples, the transformation matrix may initially be based on the parameters of the initial registration that may then be adjusted or altered using the deformation compensation.

Accordingly, certain embodiments may be performed for registering the 3D model to the patient. Process 500 described above is provided merely as an example, and to may include additional, fewer, different, or differently arranged steps than depicted in FIG. 5.

In this disclosure, various steps may be described as performed or executed by one of the components from FIGS. 1A and 1B, such as a computing device of or associated with one of imaging system(s) 106, MD controller 122 of medical device system 102, or computing device 112. However, it should be understood that in various embodiments, various components of environment 100 discussed above may execute instructions or perform steps, including the steps discussed above. A step performed by a device may be considered to be performed by a processor, actuator, or the like associated with that device. Further, it should be understood that in various embodiments, various steps may be added, omitted, and/or rearranged in any suitable manner.

FIGS. 6A-6C depict exemplary GUIs 600A, 600B, 600C generated and displayed during a medical procedure, such as an ERCP procedure. First GUI 600A shown in FIG. 6A displays a current image 602 of papilla 604, for example, captured by imaging device 212 of medical device 120 during the ERCP procedure. Papilla 604 may be the target site for cannulation during the ERCP procedure. Second GUI 600B shown in FIG. 6B displays a portion of a transformed 3D model 610 representing a position and trajectory of common bile duct 612 and pancreatic duct 614, and transformed 3D model 610 is overlaid on current image 602. Therefore, the operator views common bile duct 612 and pancreatic duct 614 at the approximate position the ducts would appear if the ducts were visible via imaging device 212. Using second GUI 600B as a guide, the operator of medical device 120 may confirm and/or adjust the position of medical device 120 (e.g., extending or retracting distal tip 210 and/or manipulating one or more of the knobs 222, 224 to control steerable section 218) and/or the tool for performing cannulation (e.g., one of tool(s) 123 using elevator 216), for example, to help ensure alignment with the particular duct to be cannulated.

In other examples, rather than overlaying a portion of the transformed 3D model itself on current image 602, a representation of the position and/or the trajectory of the ducts may be overlaid in the form of a wireframe model, centerlines, a sequence of discs positioned orthogonal to the centerline, tubular structures, etc., generated using the transformed 3D model. Third GUI 600C shown in FIG. 6C displays an exemplary centerline representation 620 of the ducts. For example, a first visual indicator 622 may be a centerline representation of the common bile duct and a second visual indicator 624 may be a centerline representation of the pancreatic duct. First visual indicator 622 and second visual indicator 624 may be visually distinct from one another to emphasize the different trajectories of the common bile duct and the pancreatic duct.

Although not shown in FIGS. 6A-6C, various other visual schemes may be employed within GUIs generated and displayed during a medical procedure. The GUIs 600A, 600B, 600C described above are provided merely as an example, and may include additional, fewer, different, or differently arranged information and/or features than depicted in FIGS. 6A-6C.

Figure 7:
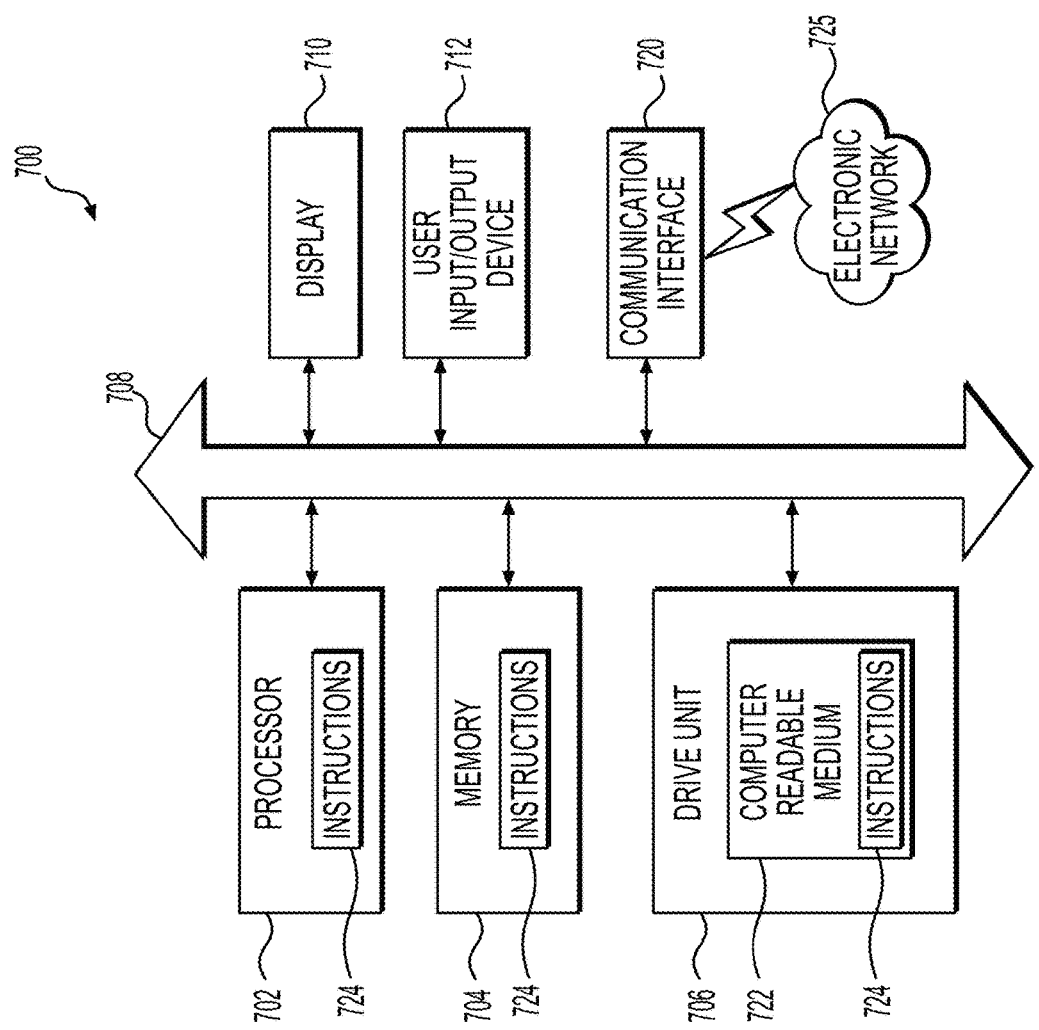
FIG. 7 depicts an example of a computing device.

FIG. 7 depicts an example of a computer 700. FIG. 7 is a simplified functional block diagram of computer 700 that may be configured as a device for executing processes, steps, or operations depicted in, or described with respect to, FIGS. 1-6C and, according to exemplary embodiments of the present disclosure. For example, computer 700 may be configured as one of a computing device of or associated with one of imaging system(s) 106, MD controller 122 of medical device system 102, computing device 112, PSS controller 130 of position sensing system 104, and/or another device or component according to exemplary embodiments of this disclosure. In various embodiments, any of the systems herein may be or include computer 700 including, e.g., a data communication interface 720 for packet data communication. Computer 700 may communicate with one or more other computers, for example, using an electronic network 725 (e.g., via data communication interface 720). Electronic network 725 may include a wired or wireless network similar to network 114 depicted in FIG. 1.

Computer 700 also may include a central processing unit ("CPU"), in the form of one or more processors 702, for executing program instructions 724. Program instructions 724 may include instructions for running one or more applications associated with 3D model extraction, 3D surface map generation, and/or 3D image registration and GUI generation on one of imaging system(s) 106, medical device system 102, or computing device 112 (e.g., if computer 700 is the computing device of or associated with one of imaging system(s) 106, medical device system 102, or computing device 112). Program instructions 724 may include instructions for running one or more operations for position and/or orientation determinations (e.g., if computer 700 is PSS controller 130 of position sensing system 104). Computer 700 may include an internal communication bus 708. The computer may also include a drive unit 706 (such as read-only memory (ROM), hard disk drive (HDD), solid-state disk drive (SDD), etc.) that may store data on a computer readable medium 722 (e.g., a non-transitory computer readable medium), although computer 700 may receive programming and data via network communications. Computer 700 may also have a memory 704 (such as random-access memory (RAM)) storing instructions 724 for executing techniques presented herein. It is noted, however, that in some aspects, instructions 724 may be stored temporarily or permanently within other modules of computer 700 (e.g., processor 702 and/or computer readable medium 722). Computer 700 also may include user input and output devices 712 and/or a display 710 to connect with input and/or output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may, at times, be communicated through the Internet or various other telecommunication networks. Such communications, e.g., may enable loading of the software from one computer or processor into another. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While principles of this disclosure are described herein with the reference to illustrative examples for particular applications, it should be understood that the disclosure is not limited thereto. Those having ordinary skill in the art and access to the teachings provided herein will recognize additional modifications, applications, and substitution of equivalents all fall within the scope of the examples described herein. Accordingly, the invention is not to be considered as limited by the foregoing description.

We claim:

1. A system for three-dimensional (3D) image registration to facilitate a medical procedure, the system comprising:
 a medical device having a distal portion configured to be inserted into a body lumen of a patient during a medical procedure, the medical device including:
  an imaging device located at a distal tip of the distal portion and configured to capture a plurality of images of the body lumen as the medical device is inserted into and navigated through the body lumen to a target site, at least one of the plurality of images including a current image of the target site; and
  a transmitter device or a receiver device of a position sensing system located at the distal tip, wherein the position sensing system is configured to determine a position or an orientation of the distal tip; and
 a non-transitory computer-readable medium storing instructions that, when executed by a processor of a computing device, causes the processor to execute the instructions to perform operations, including:
  receiving a 3D image of anatomy of the patient captured by an imaging system prior to the medical procedure;
  processing the 3D image to extract a 3D model that identifies a plurality of anatomical structures in the anatomy, including one or more anatomical structures of interest for the medical procedure;
  determining one or more of the plurality of anatomical structures identified in the 3D model are incomplete;
  estimating an incomplete portion of the one or more of the plurality of anatomical structures for inclusion in the 3D model;
  receiving the plurality of images of the body lumen captured by the imaging device during the medical procedure;
  receiving the position or the orientation of the distal tip of the medical device from the position sensing system;
  processing the plurality of images of the body lumen and the position or the orientation of the distal tip to generate a 3D surface map of at least a portion of the body lumen, the 3D surface map including a portion of the plurality of anatomical structures without the one or more anatomical structures of interest;
  registering the 3D model to the patient using the 3D surface map and the position or the orientation of the distal tip;
  based on the registering, generating a graphical user interface (GUI) that overlays a representation of a position or a trajectory of the one or more anatomical structures of interest on the current image of the target site; and
  causing display of the GUI on a display device.

2. The system of claim 1, the operations further comprising:
 generating a prompt with instructions for an operator to confirm the estimated incomplete portion; and
 causing display of the 3D model including the estimated incomplete portion and the prompt via the display device, wherein the prompt may be displayed in association with the estimated incomplete portion of the 3D model.

3. The system of claim 1, the operations further comprising:
 based on a number or type of anatomical structures in the portion of the plurality of anatomical structures included in the 3D surface map, determining that additional image data is needed to generate the 3D surface map;
 generating a prompt with instructions for an operator to move the medical device to one or more positions in the body lumen corresponding to one or more of the plurality of anatomical structures that are not included in the portion or that are included in the portion and are incomplete to capture the additional image data via the imaging device of medical device; and
 causing display of the prompt via the display device.

4. The system of claim 1, wherein registering the 3D model to the patient further comprises:
 determining a transformation matrix; and
 applying the transformation matrix to the 3D model to transform the 3D model.

5. The system of claim 4, wherein registering the 3D model to the patient further comprises:

matching one or more of the portion of the plurality of anatomical structures included in the 3D surface map to corresponding anatomical structures in the 3D model;
performing an initial registration based on the matching;
determining a deformation compensation; and
determining the transformation matrix based on the initial registration and the deformation compensation.

6. The system of claim 4, wherein generating the GUI comprises generating the GUI using the transformed 3D model, and the representation of the position or the trajectory of the one or more anatomical structures of interest includes at least one of: a portion of the transformed 3D model including the one or more anatomical structures of interest, a wireframe model of the one or more anatomical structures of interest, a centerline representation for the one or more anatomical structures of interest, a sequence of discs positioned orthogonal to the centerline for the one or more anatomical structures of interest, or a tubular structure for the one or more anatomical structures of interest.

7. The system of claim 1, the operations further comprising:
receiving spatial information for the patient from the position sensing system, the position sensing system including one or more transmitter devices or receiver devices located in a patch applied locally to the patient; and
registering the 3D model to the patient using the 3D surface map, the spatial information for the medical device, and the spatial information for the patient.

8. The system of claim 1, the operations further comprising:
identifying one or more anatomical structures from the portion of the plurality of anatomical structures in the 3D surface map by providing the plurality of images as input to a machine learning model that is trained to predict the one or more anatomical structures present in each of the plurality of images.

9. The system of claim 1, the operations further comprising:
identifying one or more anatomical structures from the portion of the plurality of anatomical structures in the 3D surface map by mapping a geometric shape of the one or more anatomical structures as 3D surfaces as part of the generation of the 3D surface map, and identifying the one or more anatomical structures based on the mapped geometric shape.

10. The system of claim 1, wherein the target site is a site for cannulation, and wherein the operations further comprise:
tracking a movement at the target site as the cannulation occurs; and
updating the GUI to deform the representation of the position or the trajectory of the one or more anatomical structures of interest overlaying the current image of the target site to match the movement of the target site.

11. The system of claim 1, the operations further comprising:
receiving, from the position sensing system, spatial information for a tool delivered to the target site via the medical device as the tool is advanced through at least one of the one or more anatomical structures of interest, wherein the tool includes one or more transmitter devices or one or more receiver devices of the position sensing system; and
using the spatial information for the tool, updating the GUI to depict a representation of the tool advancing through the representation of the position or the trajectory of the at least one of the one or more anatomical structures of interest overlaid on the current image of the target site.

12. The system of claim 1, the operations further comprising:
receiving an additional 3D image captured intraoperatively after the medical device is navigated through the body lumen to the target site; and
processing the additional 3D image in addition to the processing of the plurality of images to generate the 3D surface map.

13. The system of claim 1, the operations further comprising:
determining whether an image quality of the 3D image meets a predefined threshold prior to processing the 3D image to extract the 3D model.

14. The system of claim 1, wherein the medical procedure is an endoscopic retrograde cholangiopancreatography (ERCP) procedure, the target site is a papilla for cannulation, and the one or more anatomical structures of interest include at least a common bile duct and a pancreatic duct, and the generating of the GUI comprises:
using the registered 3D model, overlaying the representation of the position or the trajectory of the common bile duct and the pancreatic duct on the current image of the papilla to create an augmented reality image.

15. A method for three-dimensional (3D) image registration to facilitate a medical procedure, the method comprising:
receiving a 3D image of anatomy of a patient;
processing the 3D image to extract a 3D model that identifies a plurality of anatomical structures in the anatomy, including one or more anatomical structures of interest for a medical procedure;
receiving a plurality of images of a body lumen of the patient captured by an imaging device of a medical device as the medical device is inserted into and navigated through the body lumen to a target site during the medical procedure, at least one of the plurality of images including a current image of the target site;
receiving spatial information for the medical device from a position sensing system, the position sensing system including a transmitter device or a receiver device located in or on the medical device;
processing the plurality of images of the body lumen and the spatial information for the medical device to generate a 3D surface map of at least a portion of the body lumen, the 3D surface map including a portion of the plurality of anatomical structures without the one or more anatomical structures of interest;
based on a number or type of anatomical structures in the portion of the plurality of anatomical structures included in the 3D surface map, determining additional image data is needed to generate the 3D surface map;
generating and causing display of a prompt with instructions for an operator to move the medical device to one or more positions in the body lumen corresponding to one or more of the plurality of anatomical structures that are not included in the portion or that are included in the portion and are incomplete to capture the additional image data via the imaging device of medical device, wherein the 3D surface map is generated further based on the additional image data;
registering the 3D model to the patient using the 3D surface map and the spatial information for the medical device, the registering including a determination of a transformation matrix;

applying the transformation matrix to the 3D model to transform the 3D model;

generating a graphical user interface (GUI) using the transformed 3D model that overlays a representation of a position or a trajectory of the one or more anatomical structures of interest on the current image of the target site; and causing display of the GUI on a display device.

16. The method of claim 15, further comprising:

receiving spatial information for the patient from the position sensing system, the position sensing system including one or more transmitter devices or receiver devices located in a patch applied locally to the patient; and registering the 3D model to the patient using the 3D surface map, the spatial information for the medical device, and the spatial information for the patient.

17. The method of claim 16, wherein registering the 3D model to the patient further comprises:

matching one or more of the portion of the plurality of anatomical structures included in the 3D surface map to corresponding anatomical structures in the 3D model;

performing an initial registration based on the matching;

determining a deformation compensation; and determining the transformation matrix based on the initial registration and the deformation compensation.

18. A method for three-dimensional (3D) image registration to facilitate an endoscopic retrograde cholangiopancreatography (ERCP) procedure, the method comprising:

receiving a 3D image of anatomy of a patient;

processing the 3D image to extract a 3D model that identifies a plurality of anatomical structures in the anatomy, including anatomical structures of an upper gastrointestinal (GI) tract and a biliopancreatic tree of the patient, wherein at least a common bile duct and a pancreatic duct are anatomical structures of interest for the ERCP procedure;

as a medical device is inserted into a mouth of the patient and navigated through the upper GI tract of the patient to a papilla during the ERCP procedure, receiving a plurality of images of the upper GI tract, including a current image of the papilla, captured by an imaging device of the medical device, the papilla being a target site for cannulation;

receiving spatial information for the medical device from a position sensing system, the position sensing system including a transmitter device or a receiver device located in or on the medical device;

processing the plurality of images and the spatial information for the medical device to generate a 3D surface map, the 3D surface map including a portion of the plurality of anatomical structures of the upper GI tract identified in the 3D model and the papilla;

registering the 3D model to the patient using the 3D surface map and the spatial information for the medical device;

based on the registering, generating a graphical user interface (GUI) that overlays a representation of a position or a trajectory of at least the common bile duct and the pancreatic duct on the current image of the papilla; and causing display of the GUI on a display device to provide visual guidance for the cannulation of the papilla.

19. The method of claim 18, further comprising:

tracking a movement of the papilla as the cannulation occurs; and updating the GUI to deform the representation of the position or the trajectory of the common bile duct and the pancreatic duct overlaying the current image of the papilla to match the movement of the papilla.

20. A method for three-dimensional (3D) image registration, the method comprising:

receiving a 3D image of anatomy of a patient;

processing the 3D image to extract a 3D model that identifies a plurality of anatomical structures in the anatomy, including one or more anatomical structures of interest;

receiving a plurality of images of a body lumen of the patient captured by an imaging device of a medical device, at least one of the plurality of images including a current image of a target site for cannulation;

receiving spatial information for the medical device from a position sensing system at least partially located in or on the medical device;

processing the plurality of images of the body lumen and the spatial information for the medical device to generate a 3D surface map of at least a portion of the body lumen, the 3D surface map including a portion of the plurality of anatomical structures without the one or more anatomical structures of interest;

registering the 3D model to the patient using the 3D surface map and the spatial information for the medical device;

based on the registering, generating and causing display of a graphical user interface (GUI) that overlays a representation of a position or a trajectory of the one or more anatomical structures of interest on the current image of the target site for cannulation;

tracking a movement at the target site as the cannulation occurs; and updating the GUI displayed to deform the representation of the position or the trajectory of the one or more anatomical structures of interest overlaying the current image of the target site to match the movement of the target site.

* * * * *